United States Patent [19]
Estes et al.

[11] Patent Number: 5,301,284
[45] Date of Patent: Apr. 5, 1994

[54] MIXED-RESOLUTION, N-DIMENSIONAL OBJECT SPACE METHOD AND APPARATUS

[75] Inventors: Mark D. Estes, Austin, Tex.; John P. Walker, Oklahoma City, Okla.

[73] Assignee: Walker-Estes Corporation, Oklahoma City, Okla.

[21] Appl. No.: 642,508

[22] Filed: Jan. 16, 1991

[51] Int. Cl.$^5$ .............................................. G06F 12/00
[52] U.S. Cl. .................................. 395/400; 395/425; 395/161
[58] Field of Search ............... 395/120, 161, 131, 155, 395/425, 62, 60, 10, 76, 400

[56] References Cited

U.S. PATENT DOCUMENTS

| | | |
|---|---|---|
| 1,079,504 | 11/1913 | Macaulay . |
| 2,632,058 | 3/1953 | Gray .................................... 179/15 |
| 4,313,159 | 1/1982 | Shoap ................................ 395/425 |
| 4,475,156 | 10/1984 | Federico ............................. 395/700 |
| 4,721,952 | 1/1988 | Huber ................................. 340/729 |
| 4,855,903 | 8/1989 | Carleton et al. ................ 395/425 X |
| 4,887,878 | 12/1989 | Robinson et al. ....................... 385/2 |
| 4,905,163 | 2/1990 | Garber et al. ....................... 364/513 |
| 4,918,600 | 4/1990 | Harper, III et al. ................ 395/425 |
| 4,922,415 | 5/1990 | Hemdal ............................... 364/200 |
| 5,189,416 | 2/1993 | Estes .................................... 341/26 |
| 5,195,172 | 3/1993 | Elad et al. ......................... 395/62 X |
| 5,202,981 | 4/1993 | Shackelford ................... 395/425 X |

OTHER PUBLICATIONS

H. J. Durrett, ed., Color and the Computer, "Color Displays and Color Science" (G. Murch), Academic Press, Boston (1987), pp. 1-25.
C. R. Clare, Designing Logic Systems Using State Machines, 1973, McGraw-Hill, pp. 14-17.
Joblove and Greenberg, "Color Spaces for Computer Graphics," ACM Computer Graphics (SIGGRAPH 78), vol. 12, No. 3, pp. 20-25.
M. Karnaugh, "The Map Method for Synthesis of Combinational Logic Circuits," AIEE Transactions, Part I, vol. 72, Nov. 1953, pp. 593-599.
Liu and Fu, "Cellwork, Its Network Duals, and Some Applications-Three-Dimensional Karnaugh Map and its Virtual Planar Representation," Information Science, vol. 24, 1981, pp. 93-109.
Marihugh and Anderson, "The H-Diagram: A Graphical Approach to Logic Design," IEEE Transaction on Computers, vol. C-20, No. 10 Oct. 1971, pp. 1192-1196.
Patrick, Anderson and Bechtel, "Mapping Multidimensional Space to One-Dimension for Computer Output Display," IEEE Transactions on Computers, vol. C-17, No. 10, Oct. 1968, pp. 949-953.
R. Perez, Electronic Display Devices, TAB Professional and Reference Books, Blue Ridge Summit, Pa., 1988, pp. 69-129.
D. S. Rogers, Procedural Elements for Computer Graphics, McGraw-Hill, N.Y., 1985, pp. 8-19.
J. P. Roth, "The Synthesis of Switching Systems I.," Transactions of the American Mathematical Society, vol. 88, No. 2, Jul. 1958, pp. 301-327.

(List continued on next page.)

Primary Examiner—Raymond J. Bayerl
Attorney, Agent, or Firm—David Newman & Associates

[57] ABSTRACT

Object spaces which mechanize higher order relationships between attributes which describe a particular problem domain. An abstract object description defined by a set of attributes and their corresponding values is transformed into a mixed-resolution, N-dimensional object space. The mixed-resolution, N-dimensional object space represents a mechanized, logically encoded expression of attribute relationships that can be visualized. The method and apparatus interleave the frame to generate an object descriptor and generate from the frame and the object descriptor, encoded names of spatial locations for each of the N dimensions of the mixed-resolution, N-dimensional, object space, conforming to a primary form of a reflected binary code. A virtual image of the N-dimensional, object space is generated from the dimensional-spatial locations and resolution-spatial locations, and attribute values corresponding to a region of the virtual image may be selected for display.

14 Claims, 29 Drawing Sheets

OTHER PUBLICATIONS

H. Samet, The Design and Analysis of Spatial Data Structures, 1989, Addison Wesley, N.Y., pp. 104–111.
C. L. Seitz, "The Cosmic Cube," Communications of the ACM, vol. 28, No. 1, Jan. 1985, pp. 22–33.
M. A. Svilotti, "A Dynamically Configurable Architecture for Prototyping Analog Circuits," Advanced Research Proceedings of the Fifth MIT Conference, 1988, MIT, pp. 238–258.
A. R. Smith, "Color Gamut Transformation Pairs," ACM Computer Graphics (SIGGRAPH 78), vol. 12, No. 3, pp. 12–19.
S. W. Srihari, "Representation of Three-Dimensional Images," Computing Surveys, vol. 13, No. 4, Dec. 1981, pp. 399–424.
R. Hall, *Illumination and Color in Computer Generated Imagery*, Springer-Verlag: New York (1988) pp. 47–52.
M. T. Heath, "The Hypercube: A Tutorial Overview" Hypercube Microprocessors 1986, SIAM, Philadelphia (1986), pp. 7–10.
G. Knight, "Technology and Needs Analysis Report: Potential New Research Directions for MCC", Technology Strategy Section, International Liaison Office, Feb. 6, 1990, pp. 36–45.
W. C. Athas and C. L. Seitz, *Multicomputers: Message-Passing Concurrent Computers*, IEEE Computer, Aug. 1988, pp. 9–24.
R. Bayer et al., ed., *Operating Systems, An Advanced Course*, Springer-Verlag: New York (1979), pp. 2–16.
T. Berk et al., *A New Color-Naming System for Graphics Languages*, IEEE CG&A, May 1982, pp. 37–44.
R. L. Dayton, *Guide to Integrating Digital Services*, Intertext Publications, McGraw-Hill: New York (1989), pp. 61–74.
C. Faloutons, *Gray Codes for Partial Match and Range Queries*, IEEE Trans. on Software Eng., vol. 14, No. 10, Oct. 1988, pp. 1381–1393.
E. A. Feustel, *On the Avdantages of Tagged Architecture*, IEEE Trans. on Comp., vol. C-22, No. 7, Jul. 1973, pp. 644–656.
E. Gibson, *Objects-Born and Bred*, BYTE, Oct. 1990, pp. 245–254.
K. Hwang and J. Ghosh, *Hypernet: A Communication-Efficient Architecture for Constructing Massively Parallel Computers*, IEEE Trans. on Comp., vol. C-36, No. 12, Dec. 1987, pp. 1450–1466.
D. L. MacAdam, *Uniform Color Scales*, J. Optical Society of America, vol. 64, No. 12, Dec. 1974, pp. 1691–1702.
A. Newell, *On Programming a Highly Parallel Machine to be an Intelligent Technician*, Proc. of Western Joint Comp. Conf., vol. 17, May 1960, pp. 267–280.
P. K. Robertson, *Perceptual Color Spaces*, IEEE CG&A, Sep. 1988, pp. 50–64.
A. Santisteban, *The Perceptual Color Space of Digital Image Display Terminals*, IBM J. Res. Develop., vol. 27, No. 2, Mar. 1983, pp. 127–132.
L. D. Silverstein et al., *Modeling of Display Color Parameters and Algorithmic Color Selection*, Proc. of SPIE, vol. 624 (1986), pp. 26–35.
M. Gardner, *Logic Machines and Diagrams*, 2nd Ed., Univ. of Chicago Press: Chicago, 1982, 165 p., especially pp. 14–20, pp. 27–36, pp. 39–45, pp. 54–61, pp. 75–80, pp. 92–99, p. 113, and pp. 125–137.

Fig. 1A
PRIOR ART
Fig. 1B
PRIOR ART
Fig. 1C
PRIOR ART
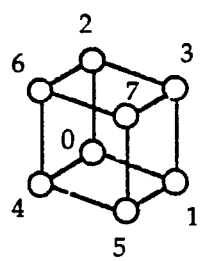
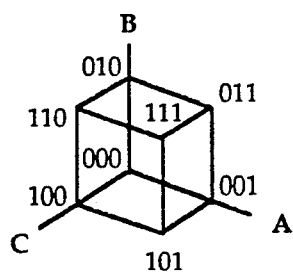
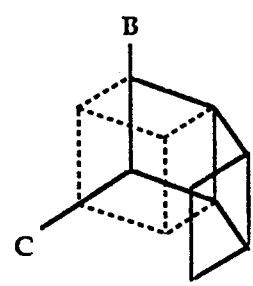
Fig. 1D
PRIOR ART
Fig. 1E
PRIOR ART
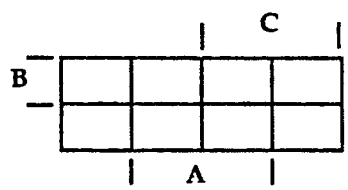
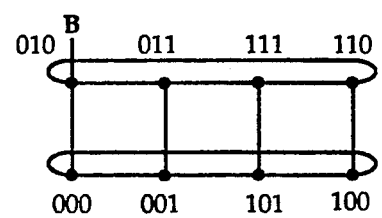

| AB\CD | $(\bar{C}\bar{D})$ 00 | $(\bar{C}D)$ 01 | $(CD)$ 11 | $(C\bar{D})$ 10 |
|---|---|---|---|---|
| $(\bar{A}\bar{B})$ 00 | 0000 $(\bar{A}\bar{B}\bar{C}\bar{D})$ | 0001 $(\bar{A}\bar{B}\bar{C}D)$ | 0011 $(\bar{A}\bar{B}CD)$ | 0010 $(\bar{A}\bar{B}C\bar{D})$ |
| $(\bar{A}B)$ 01 | 0100 $(\bar{A}B\bar{C}\bar{D})$ | 0101 $(\bar{A}B\bar{C}D)$ | 0111 $(\bar{A}BCD)$ | 0110 $(\bar{A}BC\bar{D})$ |
| $(AB)$ 11 | 1100 $(AB\bar{C}\bar{D})$ | 1101 $(AB\bar{C}D)$ | 1111 $(ABCD)$ | 1110 $(ABC\bar{D})$ |
| $(A\bar{B})$ 10 | 1000 $(A\bar{B}\bar{C}\bar{D})$ | 1001 $(A\bar{B}\bar{C}D)$ | 1011 $(A\bar{B}CD)$ | 1010 $(A\bar{B}C\bar{D})$ |

300

Fig. 13A    Fig. 13B    Fig. 13C

Fig. 14A    Fig. 14B    Fig. 14C
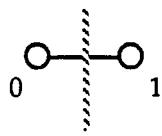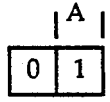
Fig. 15A    Fig. 15B    Fig. 15C
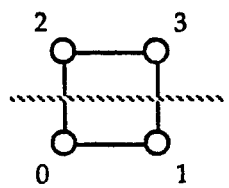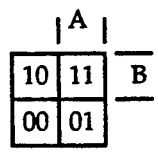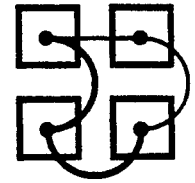

Fig. 16A    Fig. 16B    Fig. 16C
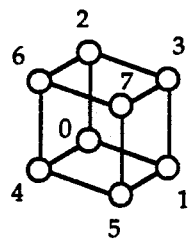
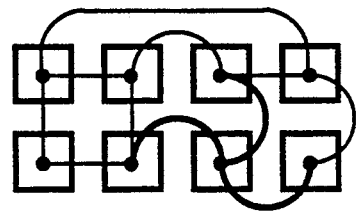
Fig. 17A    Fig. 17B    Fig. 17C
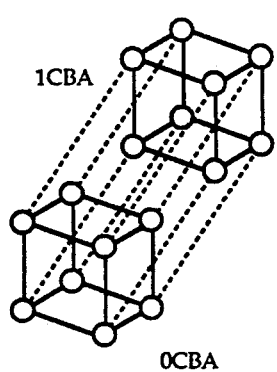
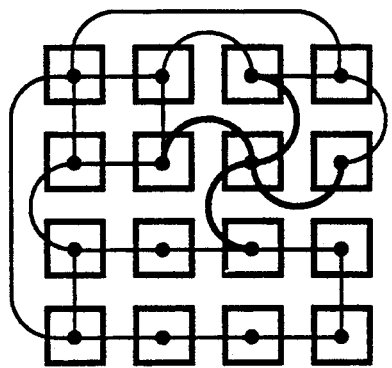

| | B | | | | |
|---|---|---|---|---|---|
| | 011 101 | 011 111 | 001 111 | 001 101 | R |
| | 011 100 | 011 110 | 001 110 | 001 100 | R' |
| | 011 000 | 011 010 | 001 010 | 001 000 | |
| | 011 001 | 011 011 | 001 011 | 001 001 | R |
| | 010 001 | 010 011 | 000 011 | 000 001 | R |
| | 010 000 | 010 010 | 000 010 | 000 000 | |
| | 010 100 | 010 110 | 000 110 | 000 100 | |
| B | 010 101 | 010 111 | 000 111 | 000 101 | R |
| B | 110 101 | 110 111 | 100 111 | 100 101 | |
| | 110 100 | 110 110 | 100 110 | 100 100 | |
| | 110 000 | 110 010 | 100 010 | 100 000 | |
| | 110 001 | 110 011 | 100 011 | 100 001 | R |
| B' | 111 001 | 111 011 | 101 011 | 101 001 | R |
| | 111 000 | 111 010 | 101 010 | 101 000 | R' |
| | 111 100 | 111 110 | 101 110 | 101 100 | |
| B | 111 101 | 111 111 | 101 111 | 101 101 | R |
| | | G | G | | |
| | | G' | | | |

*2900*

*2901*

MIXED-RESOLUTION, N-DIMENSIONAL OBJECT SPACE METHOD AND APPARATUS

PARTIAL WAIVER OF COPYRIGHT

All of the material in this patent application is subject to copyright protection under the copyright laws of the United State and other countries. As of the first effective filing date of the present application, this material is protected as unpublished material.

However, permission to copy this material is hereby granted to the extent that the owner of the copyright has no objection to the facsimile reproduction by anyone of the patent document or patent disclosure, as it appears in the United State Patent and Trademark Office patent file or records, but otherwise reserves all copyrights whatsoever.

BACKGROUND OF THE INVENTION

This invention relates to an apparatus and method for transforming an object description into mixed-resolution, N-dimensional object spaces. This invention also relates to an apparatus and method for visualizing mixed-resolution, N-dimensional object spaces, by projecting a bit-interleaved object descriptor onto a plane. More particularly, this invention relates to an apparatus and method for encoding attribute names corresponding to spatial locations with a novel k-ary reflected code.

DESCRIPTION OF THE PRIOR ART

In a survey of research directions related to visualization methods, the Microelectronics and Computer Consortium (MCC) characterized the field of abstract visualization as a mapping of logical object relations into visual space ". . . so that inferences drawn from the visual representation can be carried back into the abstract domain." For applications like exploring high-dimensional multivariate data ". . . visualization of concrete things is not as important as visualization of abstract entities." In such applications ". . . the problem of what to represent and how to deliver the representation are the key, while photorealism is not as important."

A significant class of problems related to abstract visualization have solutions which are not arithmetic in nature. Furthermore, the explanation of a particular result is as important to an appropriate solution as the result itself. Ideally, the method employed for solving such problems should enable abstract visualization of the problem-solving process itself. The simplification of Boolean function expressions is a particularly well-known example of such problems. By constructing truth tables in which all possible values are tabulated for a circuit, the designer is obliged to consider all possible inputs, thereby eliminating errors due to certain input conditions being overlooked.

Early approaches to devising a mechanical procedure for improving circuit design included a "chart method" developed by the Harvard University Computation Laboratory, which was further developed by Maurice Karnaugh in "The Map Method of Synthesis of Combinational Logic Circuits," AIEE Transactions, Part I, Vol. 72, November 1953, pp. 593-599.

Karnaugh describes a method for mapping abstract representations of circuit inputs into visual space. The Karnaugh map, often called a k-map, is a widely known technique for visualizing logical expressions based on a two-valued Boolean algebra. Entries representing circuit inputs correspond to a position in a k-map derived from visualizing the codes as points in a binary n-space. The k-map is a two-dimensional representation of this space mapped onto the Cartesian plane by labeling each axis with a binary Gray code. Inferences drawn from this visual representation of logic expressions usually result in a reduction of the canonical expression. It has long been known that Karnaugh's graphical method of representing all possible combinations of N switching variables on a plane breaks down for problems with a large number of switching variables.

A well-known aspect common to all Gray codes is that consecutive codewords differ in only one quantum interval, that is, one bit position in the case of binary Gray codes. A Gray code is said to cycle if its first and last codewords differ in only one quantum interval, otherwise it describes a path. Each consecutive codeword in a binary Gray code can be represented by the bit position that changes. Given an initial codeword and a transition sequence the entire set of codewords can be generated. U.S. Pat. No. 2,632,058 issued to Frank Gray distinguishes between a primary form and secondary variants of the reflected binary code:

Because this code in its primary form may be built up from the conventional binary code by sort of a reflection process and because other forms may in turn be built up from the primary form in similar fashion, the code in question, which has as yet no recognized name, is designated in this specification and in the claims as the 'reflected binary code.'

Some forms of the reflected binary code offer special advantages over others for particular applications.

FIGS. 1A-1E show a prior art method of unfolding a binary 3-cube onto a plane as a k-map, described by Clare in *Designing Logic System Using State Machines,* 1973, McGraw-Hill, N.Y., pp. 14-15.

FIG. 2 is a prior art representation of binary n-cubes as k-maps, showing a 0-cube k-map 200, a 1-cube k-map 201, a 2-cube k-map 202, a 2-cube k-map 203, a 3-cube k-map 204, and a 4-cube k-map 205. The 2-cube k-maps 202, 203 are different representations for a two-variable k-map shown by Karnaugh in the article referenced above. Such alternate spatial representations are inconsistent with each other. Furthermore, region identifiers A 206, B 207, and C 208 in the 3-cube k-map 204 of FIG. 2 are located in a manner inconsistent with the diagram of the 2-cube k-map 202.

FIG. 3A shows a four-variable Karnaugh map encoded by labeling each axis with a binary Gray code. Map cells 300 of FIG. 3A correspond to the grid cells 301 of FIG. 3B. The labeling method of FIG. 3B is a simplification of the method of FIG. 3A. Grid cells 301 in FIG. 3B are distinguished by region identifiers 302. Grid cells 301 in FIG. 3B within a particular region 302 have a logical value of one for the bit position in corresponding map cell 300 names of FIG. 3A.

FIGS. 4A-4B are a prior art method of visualizing the binary 5-cube and the binary 6-cube as k-maps. Clare, in the reference cited above, shows the 5-cube 400 and the 6-cube 402 copied and translated to the right 401 and downward 403, respectively.

FIG. 5 shows a device proposed by Karnaugh, to visualize the synthesis of a network of six variables:

[The three-dimensional cube]... consists of four 6-inch plexiglass sheets supported at 1½-inch intervals by rods . . . In using it we employ movable markers . . . The extension to seven variables is probably best accomplished by placing two cubes side by side . . . Eight variables can be handled with a set of four cubes, and nine variables require eight cubes. In the latter case it is convenient to make them so as to stack easily into two layers of four each. Beyond nine variables, the mental gymnastics required for synthesis will, in general, be formidable.

The application of k-maps for problems of more than four variables has been described in the literature as tedious; therefore, the k-map's utility is generally limited to the introduction of ideas about logic circuits and their synthesis. An article written by J. P. Roth and entitled, "The Synthesis of Switching Systems I.," *Transactions of the American Mathematical Society*, Vol. 88, No. 2, July 1958, pp. 301–327, describes an alternate topological representation of Boolean functions called the cubic notation. Although Roth's approach is an improvement over Karnaugh in the mechanization of Boolean functions, visualization of problems of more that a few variables is not achievable.

An article by Liu and Fu, "Cellwork, Its Network Duals, and Some Applications—Three-Dimensional Karnaugh Map and Its Virtual Planar Representation," *Information Science*, Vol. 24, 1981, pp. 93–109, is representative of various attempts to generalize k-map methods to other disciplines. The "virtual planar representation" of a three-dimensional k-map is used to study "cell-work topology" from a network point of view. Other prior art abstract visualization methods include mappings of high-dimensional multivariate functions, presenting a two-dimensional view of a function of many variables. In an article by Patrick et. al., "Mapping Multidimensional Space to One Dimension for Computer Output Display," *IEEE Transactions on Computers*, Vol. C-17, No. 10, 1968, p. 949, the following problem is presented:

Consider the problem of displaying a real-valued function $f(x1, x2 \ldots, x[n])$ of $[n]$ real variables on a computer output display. . . . If $[n]=1$, it is clear how $f(x[n])$ can be processed for display on a two-dimensional screen; but if $[n]>1$, the required processing is not as obvious.

Patrick's approach to displaying a two-dimensional view of N-dimensional functions for $n>1$ establishes a one-to-one correspondence between the N-dimensional domain if "f" is bounded, that is, statically predetermined.

Prior art methods cited above primarily are concerned with the visual representation of logical objects; however, the prior art also teaches methods for the logical representation of visual objects. Srihari in his article, "Representation of Three-Dimensional Images," *Computing Surveys*, Vol. 13, No. 4, December 1981, pp. 401 & 405, describes symmetric recursive indexing as a method of partitioning a volume:

Images that are produced by sensing objects through a form of radiant energy, for example, . . . are inherently continuous. Computer representation of 3D images requires a sampling of the volume to extract a discrete set of values . . . The cubic space is subdivided into eight subcubes (octants) of equal volume. Each of these octants will either be homogeneous (e.g., uniform attenuation) or have some nonuniformity. The heterogeneous octants are further divided into suboctants. This procedure is repeated as long as necessary until we obtain blocks (possibly single voxels) of uniform properties.

Other prior art methods seek to control the logical representation and visual expression of object relationships. U.S. Pat. No. 4,721,952 entitled, "Apparatus and Process for Graphically Representing Three-Dimensional Objects in Two-Dimensions", issued to Huber describes a process for the perspective representation of objects on the screen of a numerically controlled machine tool. The object is resolved into a series of sections (slices) which are represented successively to produce a visual image of the object. Huber's invention claims an improvement of . . . a process for controlling a display device to represent a three-dimensional object such as a workpiece, wherein the representation is based upon data and commands stored in a computing device such as a computer.

As machine and process operations become more specialized, controllers that are capable of adapting to changes due to unforeseen application requirements or further specialization become necessary. Federico and Webster in U.S. Pat. No. 4,475,156, entitled "Virtual Machine Control," teach that ". . . a totally hardware controller to provide these features is often prohibitive, inflexible, and costly." Problems with prior art controls include a lack of appropriate modularity and a lack of sufficient mechanisms to support appropriate modularity in the firmware. Other prior art controls require a detailed knowledge of the operation of the control kernel for usage. Further problems with prior art controllers include a general lack of appropriate mechanisms for accomplishing the specialize objectives.

Heath in an article "The Hypercube: A Tutorial Overview," *Hypercube Multiprocessors* 1986, SIAM, Philadelphia, 1986, pp. 7–10, teaches:

. . . in a hypercube (also variously called the binary N-cube, cosmic cube, homogeneous ensemble machine, etc.), 2N processors are consecutively numbered (or tagged) by binary integers (e.g., bit strings of length N) from 0 through $2n-1$. Each processor is connected to all of the other processors whose binary tags differ from its own by exactly one bit. Topologically, this arrangement places processors at the vertices (corners) of an N-dimensional cube. In practice, the actual layout of the processors is a linear arrangement in a card cage or a planar arrangement on a printed circuit board; the cube connections are made by wires, conducting layers, or a backplane.

FIGS. 6A–6D are diagrams of a binary 6-cube encoded in accordance with prior art h-cube replication methods. Seitz in the article, "The Cosmic Cube," *Communications of the ACM*, Vol. 28, No. 1, January 1985, p. 22, describes 64 computers ". . . connected by a network of communication channels in the plan, of a binary 6-cube." The interconnection pattern of FIG. 6A is similar to that used by Seitz. Each node of FIG. 6B is linked by arcs to six other nodes.

FIGS. 10A–10B show a diagram of a four-dimensional hypercube, called a binary 4-cube. Each element of FIG. 10A is referred to as a node 1000. The dimensions of FIG. 10A are represented as a link 1001 connecting nodes 1000. The binary 4-cube is shown partitioned 1004 in FIG. 10B as two subspaces: subspace 0CBA 1002 and subspace 1CBA 1003.

Hypercubes of arbitrary dimension can be made using a linear arrangement with connecting wires (FIG. 2). The cube of each dimension is obtained by replicating the one of next lower dimension, then connecting corresponding nodes. The node names resulting from such hypercube interconnection schemes correspond to prior art two-dimensional recursive indexing methods, similar to the method described by Srihari in his article referenced above. Recursive indexing has been independently discovered by practitioners in diverse fields. Recursive indexing is not extendable to generalized N-dimensional resolution, where the resolution of each dimension is permitted to differ. A hypercube, when projected onto a plane using the method of recursive indexing is routinely referred to in prior art literature as a binary n-cube. This binary space partitioning procedure, however, actually describes an k-ary 2-cube, that is, a two-dimensional space with k=2 bits of resolution for each dimension, whose elements are interconnected as a binary n-cube. Such topological ambiguity frustrates the mechanized visualization of higher-order, N-dimensional spaces.

Marihugh and Anderson in their article, "The H Diagram: A Graphical Approach to Logic Design", *IEEE Transactions on Computers*, Vol. C-20, No. 20, October 1971, pp. 1192-1196, describe a geometric model which is intended to visually aid the analysis of binary functions. Their method is based on geometrically transforming the coordinates of a hypercube onto a plane. The H diagram method of visualizing the coordinates of a binary hypercube by transforming its coordinates onto a plane is not extendable to generalized N-dimensional space, where the resolution of each dimension is permitted to differ. Sivilotti in a paper, "A Dynamically Configurable Architecture For Prototyping Analog Circuits," in *Advanced Research in VLSI, Proceedings of the Fifth MIT Conference*, 1988, MIT, p. 248, describes a binary H-tree hierarchical interconnect structure used to physically place leaf cells and crossbar interconnect switches on a grid with parallel decoders around the chip perimeter as a simpler alternative to a hierarchical decoder. Sivilotti also refers to indirect element name (switch address) transformation as the ". . . mapping between hierarchical interconnect matrix coordinates and flat Cartesian coordinates performed by the embedding compiler."

Colorimetry is a perceptual science which studies and attempts to quantify how the human visual system perceives color. This study of perception has resulted in various systems of color representation, each intending to reduce problems associated with subjective color selection and reproduction. Six color systems often used in association with computer-related information display include: the Munsell color system, HSV hexcone, HSL double hexcone, HSL double cone, HSL cylinder, and the RGB color cube.

The Munsell color system is described in an article by Meyer and Greenburg entitled, "Perceptual Color Spaces for Computer Graphics," *Computer Graphics*, Vol. 14, No. 3, 1980, pp. 254-261, in relation to reproduction of color on a television monitor:

Deciding which Munsell renotation colors are reproducible on the monitor is difficult because the monitor and Munsell color gamuts (regions of realizable color) have irregular shapes and their intersection is not well defined.

A. R. Smith in "Color Gamut Transformation Pairs," *ACM Computer Graphics* (SIGGRAPH 78), VOL. 12, No. 3, pp. 12-19, describes the HSV (hue, saturation, and value) hexcone, which used a neutral axis from black to white. At the white point is a hexagon with vertices representing the colors at the vertices of the color cube.

D. F. Rogers in his book, *Procedural Elements for Computer Graphics*, McGraw-Hill, N.Y., 1985, pp. 403-404, describes the HSL (hue, saturation, and lightness) double hexcone. This color system is similar to the HSV hexcone with the exception that the full colors are represented with a value of 0.5 instead of being equal to white.

Joblove and Greenburg in their paper, "Color Spaces for Computer Graphics," *ACM Computer Graphics* (SIGGRAPH 78), Vol. 12, No. 3, pp. 20-25, describe a variant of the HSL double hexcone called the HSL double cone, whose cross-section is circular rather than hexagonal. In the same paper Joblove and Greenburg describe the HSL cylinder, which expands the base and top of the double cone into black and white circles.

Each of the color representation systems mentioned above use some variant of a radial coordinate system to compute the location of a particular color sensation in their respective color spaces. Meyer and Greenburg in their article referenced above make the following observation:

. . . A problem inherent with any color organization such as The Munsell Book of Color that uses a cylindrical coordinate system is that the spacing between colors changes as two radial lines are followed outwards from the center of the cylinder. . . . The idea is to define a color system in which an equal perceptual distance separates all of the colors. For example, the grayscale of the system should provide a smooth transition between black white...such an ideal system has yet to be found . . .

The RGB color cube represents the red, green, and blue monitor primaries as orthogonal axes. The colors that are displayable on the monitor are within the cube from (0, 0, 0) to (1, 1, 1). The neutral axis is a (diagonal) line from the black point (0, 0, 0) to the white point (1, 1, 1). The color cube has been referred to in the literature as a "natural" coordinate system in the sense that the three color components are mapped into an orthogonal coordinate system in the same fashion as three-dimensional geometry.

Color representations used in computer graphics are closely linked to both the color reproduction device and to a method of color selection. Uniform color spaces can be used to decide at what level of resolution the color information should be encoded. Two-dimensional data plots, for example, require uniform color spaces to select color scales. In the prior art color systems referred to above the pigment gamut used to derive color spaces is generally smaller than the gamut of a color monitor and the pigment gamut is irregular. According to Meyer and Greenburg, referenced above (p. 260), ". . . this makes it difficult to find color scales that incorporate the most brilliant monitor colors."

Richard Perez, in his book *Electronic Display Devices*, TAB Professional and Reference Books, Blue Ridge Summit, Pa., 1988, pp. 69-129, presents a detailed description of CRT electronic display device technology. The number of colors that can be produced on a CRT display, for example, depends on the number of steps of gray level obtainable for each phosphor (compounds that emit light when bombarded by electrons). If the electron gun can be stepped over four levels (2 bits), the resulting palette has sixty-four colors. Some systems currently available are capable of 1024 steps of gray from each gun (10 bits). Systems capable of 256 steps of gray from each gun (8 bits) are more common, however. Such systems can produce a palette of over 16 million unique combinations. The eye is not capable of discriminating many of the small changes in color so that the viewable palette has many fewer colors. In a chapter entitled, "Color Displays and Color Science," *Color and the Computer*, Academic Press, Boston, 1987, p. 13, the section entitled, "Visual Display observation:

. . . Under optimal conditions, a total of about three million discriminable colors can be produced in a visual display; that is, colors that are recognizably different when placed adjacent to one another. The palette shrinks to about 7000 when colors located at different screen areas must be immediately recognized as different from one another. . . . The obtainable level of saturation for additively-mixed colors can be extended by increasing the number of primaries . . . The color television industry experimented with four or five primaries but concluded that the improvement in color did not offset the increase in the expenses of production of such receivers. Visual displays followed the lead.

In U.S. Pat. No. 4,887,878 entitled, "Optical Modulation Device," Robinson and Sanford teach: "To convey information on an optical wave, some property of that wave has to be modulated or changed in accordance with the information and adopted coding system." Well known in the art are devices which rely on various electro-optical, thermo-optical, or acousto-optical properties of materials for modulating electromagnetic carrier waves in the optical region of the spectrum.

Separation requires couplers, like the one shown in FIG. 7, that are sensitive to wavelength, so light 700 can be directed along different paths 702-706. A diffraction grating 701 is used to spread out a spectrum of light from the input fiber 700 and focus specific wavelengths in that spectrum onto fibers in a linear array 702-706. Conversely, if the outputs were reversed, the grating 701 would combine the five wavelengths 702-706 into a single output at the top fiber 700.

In the article "Integrated Optics," in *Optics Source Book*, S. Parker, ed., McGraw-Hill, N.Y., 1988, pp. 287-291, Streifer describes light transmission in planar waveguides based on ". . . dielectric structures that confine the propagating light to a region with one or two very small dimensions, on the order of the optical wavelength." FIG. 8 shows prior art prism input coupling 800 and grating output coupling 803 of an external light beam 80 into a thin-film waveguide 802. By reversing the incident 80 and output 804 beam directions the roles of the prism 800 and grating 803 couplers are interchanged. Streifer further describes optical integrated circuit (OIC) switching and modulation applications:

Both lithium niobate and gallium arsenide belong to the family of electro-optically active crystals. When an electric field is applied to these materials, their refractive indices are modified. . . . If the waveguides are voltages to the electrodes will cause the transfer of optical power from one waveguide to its neighbor with high efficiency and little residual power in the initial guide.

FIG. 9 shows a prior art "4 by 4" directional coupler switching network in which each of four input optical signals 900 may be switched to any one of four output ports 904. Conducting electrodes 901 deposited on the surface of a crystaline substrate 902 parallel to two closely-spaced waveguides 903. Such an optical integrated circuit serves to interconnect four computers through optical fibers. Switches are in effect modulators. Prior art modulation is a process in which information is encoded onto an optical wave. According to Streifer, referenced above, ". . . Pulse modulation results simply by interrupting or connecting a light wave in a manner intelligible to a receiver. By transferring light into or out of a waveguide in response to an electric signal at a switching electrode, the output optical wave becomes modulated; that is the switch acts as a modulator."

A long felt need exists for a synthetic method which distinguishes between the essentials of a problem and the formulation of a solution. The separation of problem space formulation and formulation of solution strategies which navigate problem space relationships requires a mechanized method which can be visualized. The invention disclosed herein permits a problem characterized by attributes comprising an object description to be transformed into a mixed-resolution, N-dimensional object space of encoded attribute relationships which can be visualized. Accordingly, the foregoing discussion of the prior art is representative of the problem of representing mixed-resolution, N-dimensional objects and spaces.

OBJECTS OF THE INVENTION

An object of the invention is to mechanize the generation of mixed-resolution, N-dimensional object spaces related to complex problems with a large number of variables, where the number of variables is not limited by the method.

An additional object of the invention is to mechanize the visualization of mixed-resolution, N-dimensional object spaces related to complex problems with a large number of variables, where the number of variables is not limited by the method.

Another object of the invention is to represent logical objects visually such as logical color specifications and visual color sensations.

A further object of the invention is concurrent control of a plurality of views of one or more object spaces.

A still further object of the invention is an apparatus described herein as the kernel of a modular object description system.

An object of the invention is to dynamically control the logical representation and the visual expression of object descriptions in an object space.

Another object of the invention is concurrent control of a plurality of transition paths in an object space.

An object of the invention is concurrent control of a plurality of element relations in an object space.

A further object of the invention is concurrent control of a plurality of regions in an object space.

SUMMARY OF THE INVENTION

Object spaces representing very simple object descriptions can be formed manually and, in a few instances, mentally; however, description spaces of actual systems quickly exceed the feasible limits of mental visualization and manual procedures. The present invention, therefore, mechanizes higher order relationships between attributes which describe a particular problem domain. The novel method and apparatus disclosed herein transforms an abstract object description defined by a set of attributes and their corresponding values into a mixed-resolution, N-dimensional object space. The mixed-resolution, N-dimensional object space represents a mechanized, logically encoded expression of attribute relationships that can be visualized. Therefore, an illustrative embodiment of the present invention is an apparatus that is part virtual machine, providing an appropriate level of application independence and device transparency.

According to the present invention, as embodied and broadly described herein, a process for generating and visualizing mixed-resolution, N-dimensional object spaces using a computing device such as a computer is provided. The computing device may be of the type comprising means for inputting, storing and processing data and commands, means for generating a logical representation of the N-dimensional object space in response to the stored data and commands, display logic for generating a virtual image representing the N-dimensional object space in response to the stored data and commands, and display means for displaying a visible representation of the virtual image.

In the case of user-specified attributes the process starts with the user inputting to the computing device the attributes and the computing device generating from the attributes a frame for the N-dimensional object space. The bits of the frame are then interleaved to generate an object descriptor. From the frame and the object descriptor, the computing device generates dimensional-spatial locations of the N-dimensional object space. The computing device also generates object selectors which correspond to interleaved frame data for each dimensional-spatial location in the N-dimensional object space. The computing device generates a virtual image of the N-dimensional object space from the dimensional-spatial locations and the object selectors. A user or an application procedure selects a logical region of the virtual image. The process may further include the step of displaying the selected logical region of the virtual image of the N-dimensional object space on the display means.

The process further includes having the computing device generate, from the frame and the object descriptor, resolution-spatial locations for resolution levels of each of the N dimensions for a mixed-resolution, N-dimensional object space. Subsequently an object selector is generated from the frame data for each spatial location in the mixed-resolution, N-dimensional object space. A virtual image of the N-dimensional object space is generated from the resolution-spatial locations and the dimensional-spatial locations. A user or an application procedure selects a logical region of the virtual image. The process may including using the computing device for displaying the selected logical region of the virtual image of the mixed-resolution, N-dimensional object space on the display means.

The present invention alternatively may be embodied as an apparatus for generation and visualization of mixed-resolution, N-dimensional object spaces. In the case of user object description, a user specifies a particular set of attributes defining dimensions and resolution levels. In the case of an application-driven object description, an application procedure specifies a particular set of attributes defining dimensions and resolution levels. In the case of sensed physical phenomena, such as electromagnetic signals, the apparatus transforms analog signals into a digital form which specifies a particular set of attributes defining dimensions and resolution levels.

The apparatus includes means for generating a frame from the specified attributes for the N-dimensional object space. Means for interleaving bits generates an object descriptor which corresponds to interleaved frame data. Using the frame and the object descriptor the present invention uses means for generating dimensional-spatial locations of the N-dimensional object space. The frame data is used to generate an object selector for each dimensional-spatial location in the N-dimensional object space. The dimensional-spatial locations and the object selectors are used to generate a virtual image of the N-dimensional object space. A logical region or related of the virtual image is selected. Display means may display the selected logical region of the virtual image of the N-dimensional object space.

The apparatus of the present invention additionally may include means for generating resolution-spatial locations for resolution levels of each of the N dimensions for a mixed-resolution, N-dimensional object space using the frame and the object descriptor. The frame and object descriptor are used to generate an object selector for each resolution-spatial location in the mixed-resolution, N-dimensional object space. Using the frame, frame data, the resolution-spatial locations, and the dimensional-spatial locations, a virtual image of the N-dimensional object space is generated, and means is provided for selecting a logical region of the virtual image. Frame data for a particular object are used to generate a single object selector to reference a particular location in the mixed-resolution, N-dimensional object space.

An illustrative example of the present invention relates to color perception, color specification, and color spaces; and, in particular, to the production and visualization of uniform color spaces. A color naming method for controlling RGB values by indirectly specifying RGB signal voltages and visualizing the resulting distribution of perceivable colors in the RGB color space is presented in accordance with the method disclosed herein.

The color naming method used in accordance with the present invention, is the process by which the name of a particular color experience is encoded for both the purpose of uniform color selection and the purpose of reproduction on an electronic display. The system of color representation used to form a uniform color space is to name colors in terms of the additive relations of red, green and blue. The resultant RGB system specifies a trio of values ranging from 0 to 1 or 0% to 100% for each of the three primaries. The color relationships that result form a cube. The RGB system is a simple and direct approach to the problem of color description that incorporates the principles of additive color mixture; that is, the user specifies color directly in terms of the electrical activity that the specification will induce. In the reference by Murch, cited in the Description of the Prior Art, the difficulty of specifying additive color relationships is discussed:

> . . . For individuals understanding the nuances of additive color mixture, the RGB System is comfortable, . . . Even for those individuals with a clear understanding of additive color, the location and proper specification of colors within the interior of the cube, when some real value for all three primaries is required, proves difficult. Imagine selection of a medium brown, for example. The greatest difficulty is encountered when a color of proper hue and brightness has been located and a shift in saturation is desired. Such a shift would require a disproportionate change in all three values.

The novel method for generating, controlling and visualizing the distribution of perceivable colors in a RGB color space is described below. A primary aspect of the method disclosed herein is that the encoded pattern of bits which specifies (physical) RGB signal voltages also (logically) names a particular location in a displayable uniform color space. Another aspect of the method disclosed herein is that the logical naming method of invention illustrated by the color space example may be generalized to include a novel method for optical modulation.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description, serve to explain the principles of the invention.

FIGS. 1A-1E are diagrams of the binary 3-cube "unfolded" in accordance with prior art methods;

FIGS. 13A-13C show expressions of a zero-cube;

FIGS. 14A-14C show expressions of a one-dimensional, object space;

FIGS. 15A-15C show expressions of a two-dimensional, object space;

FIGS. 16A-16C show expressions of a three-dimensional, object space;

FIGS. 17A-16C show expressions of a four-dimensional, object space;

FIGS. 18A-16C show expressions of a five-dimensional, object space;

FIGS. 28A-28C are diagrams of a sixty-four-element RGB color space;

DETAILED DESCRIPTION OF THE PREFERRED EMBODIMENTS

Figure 2A:
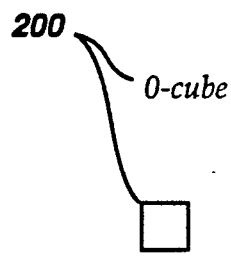
FIGS. 2A-2F are a prior art representation of n-cubes as k-maps.
Figure 2B:
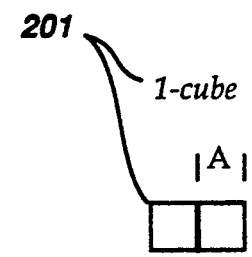
Figure 2C:
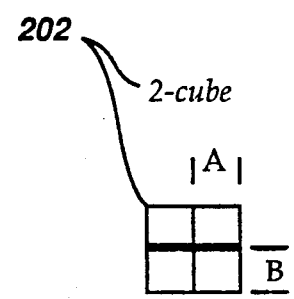
Figure 2D:
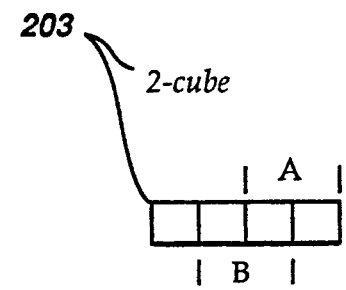
Figure 2E:
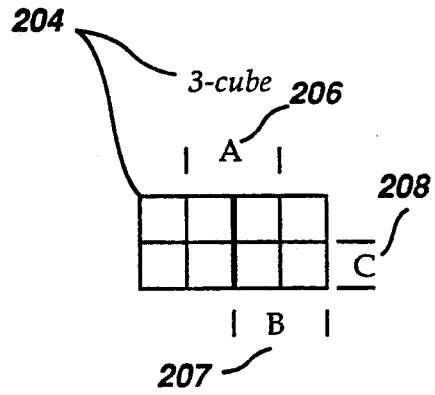
Figure 2F:
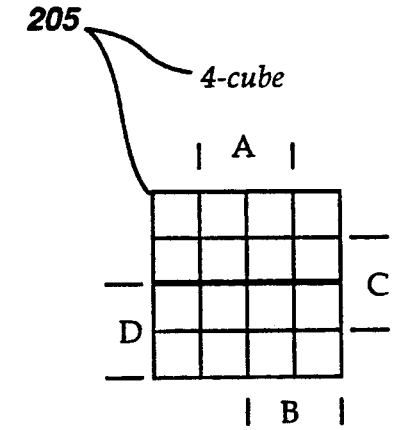
Figures 3A, 3B:
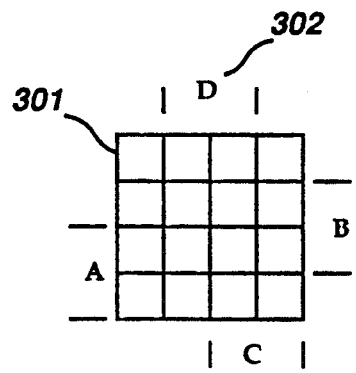
FIGS. 3A-3B are a prior art representations of a four-variable Karnaugh map.
Figure 4A:
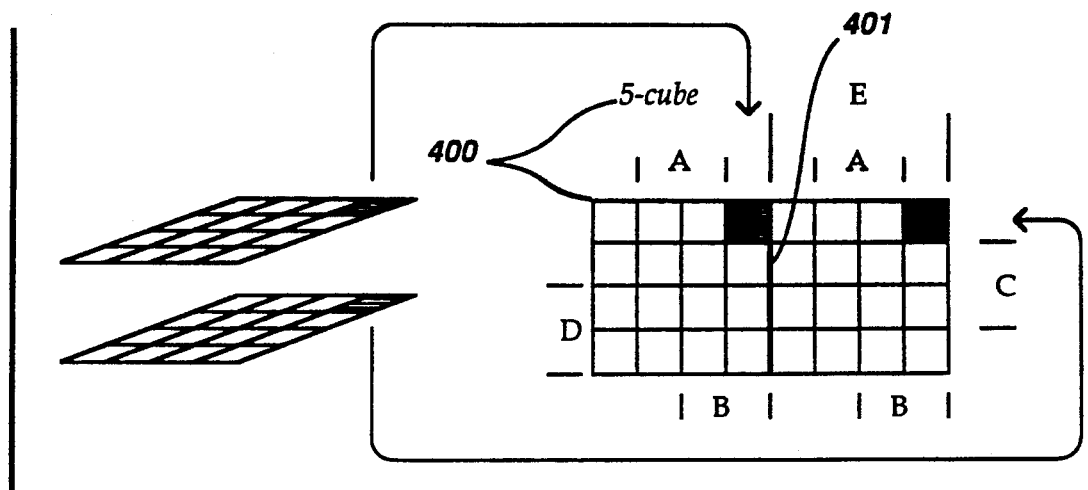
FIGS. 4A-4B are a prior art representation of a binary 5-cube and a binary 6-cube.
Figure 4B:
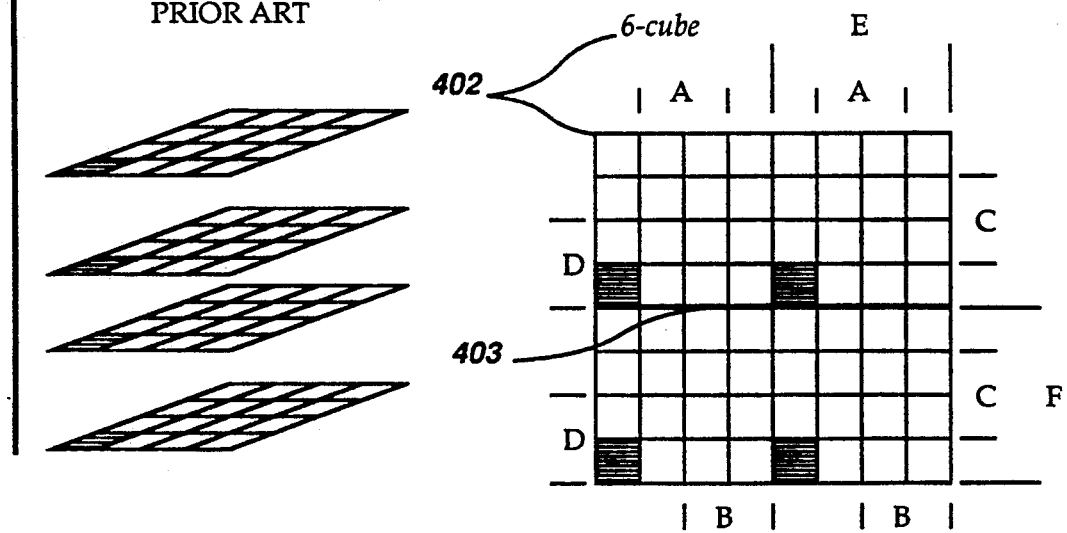
Figure 5:
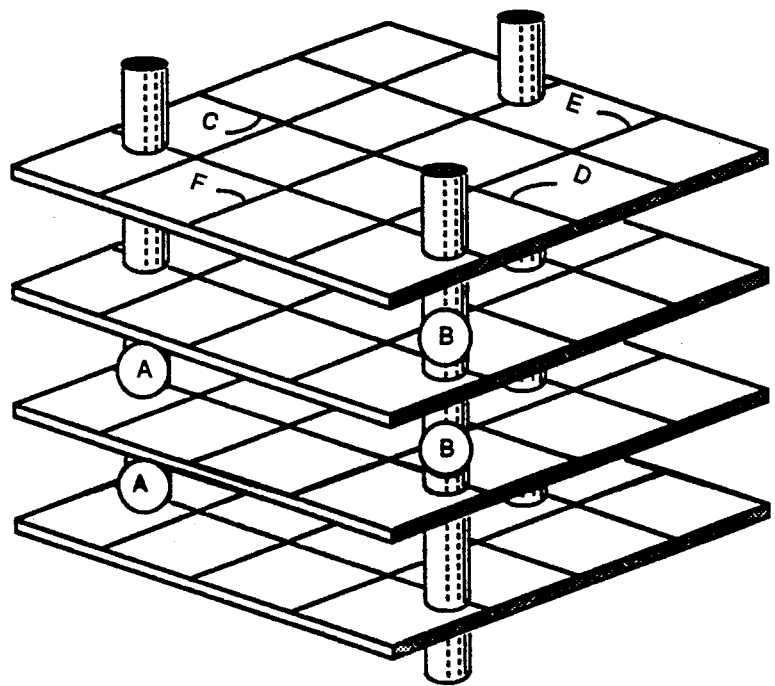
FIG. 5 shows a prior art device for extending the binary 6-cube to visualize higher order spaces.
Figure 6A:
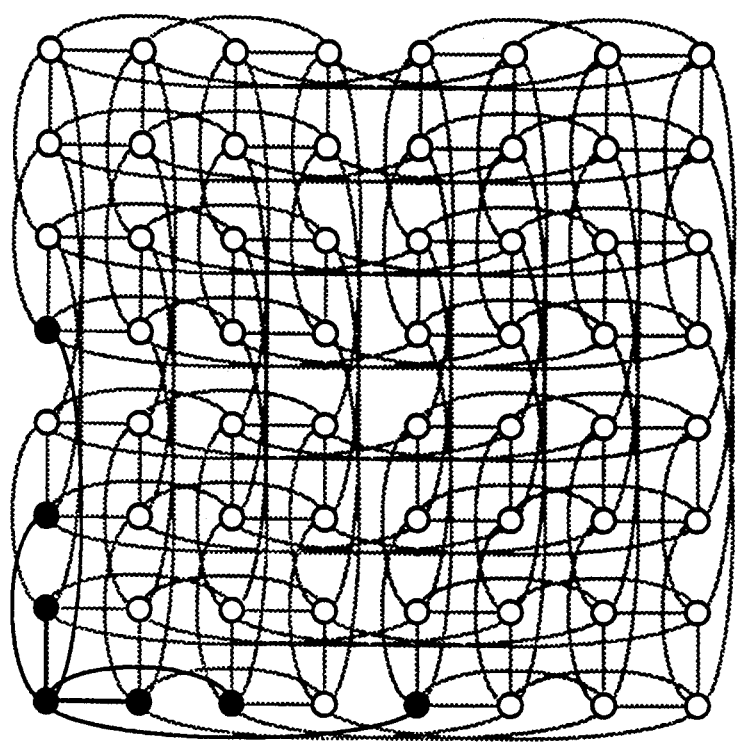
FIGS. 6A-6D are a diagrams of a binary 6-cube encoded in accordance with prior art two-dimensional recursive indexing methods.
Figure 6B:
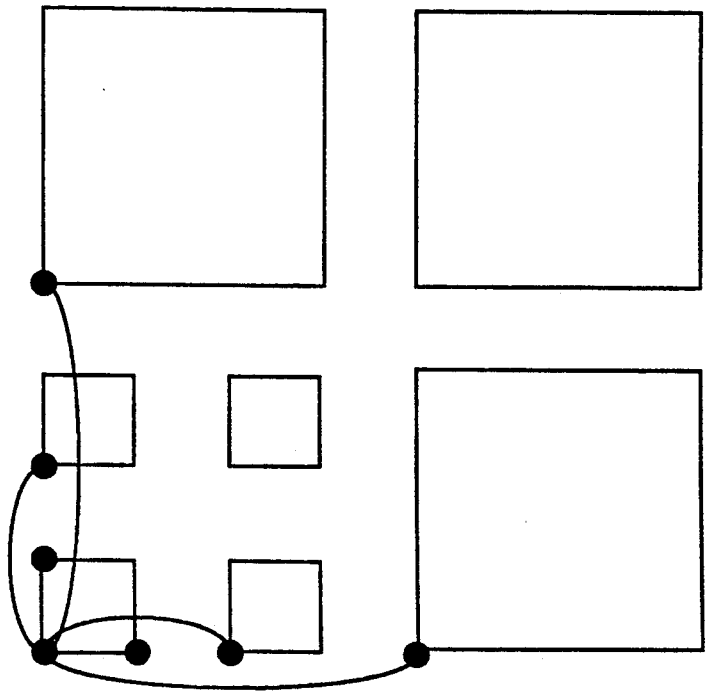
Figure 6C:
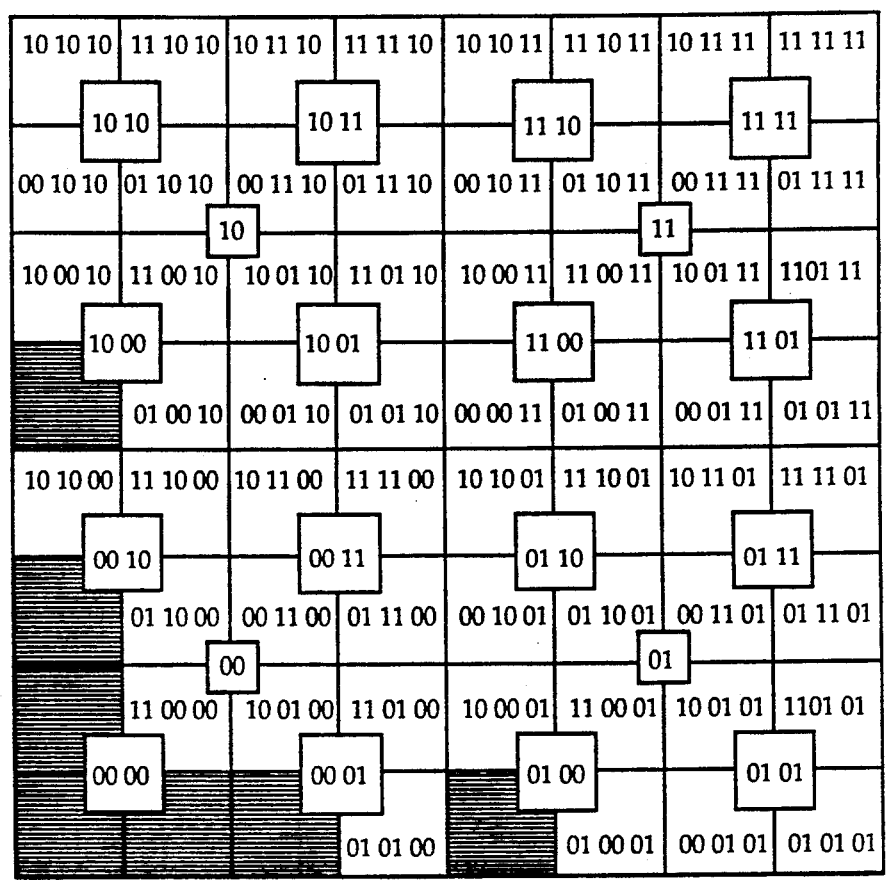
Figure 6D:
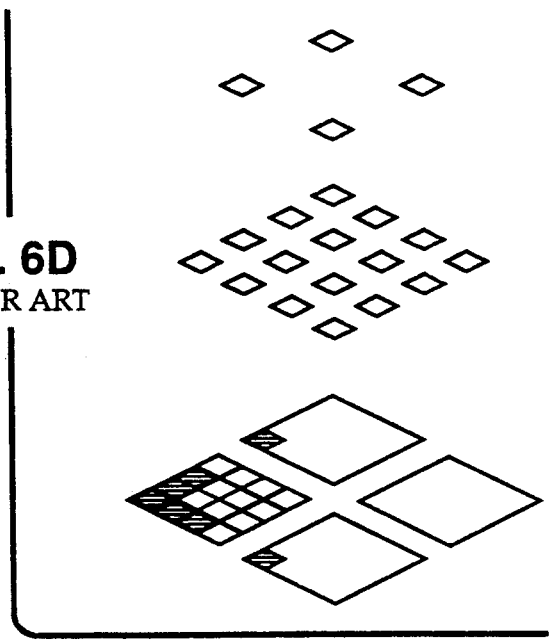
Figure 7:
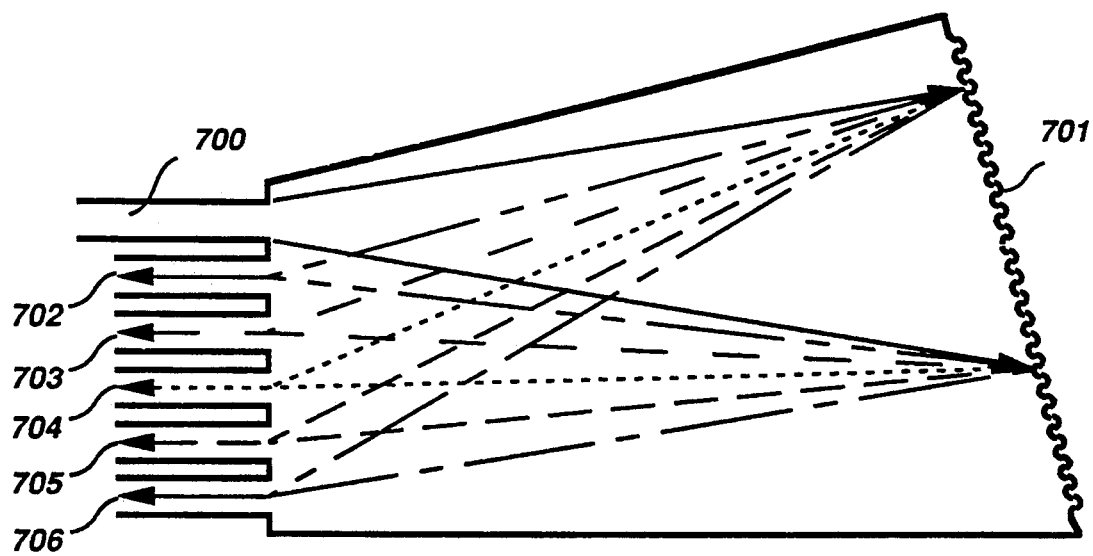
FIG. 7 shows prior art distribution of multiple wavelengths to separate fibers.
Figure 8:
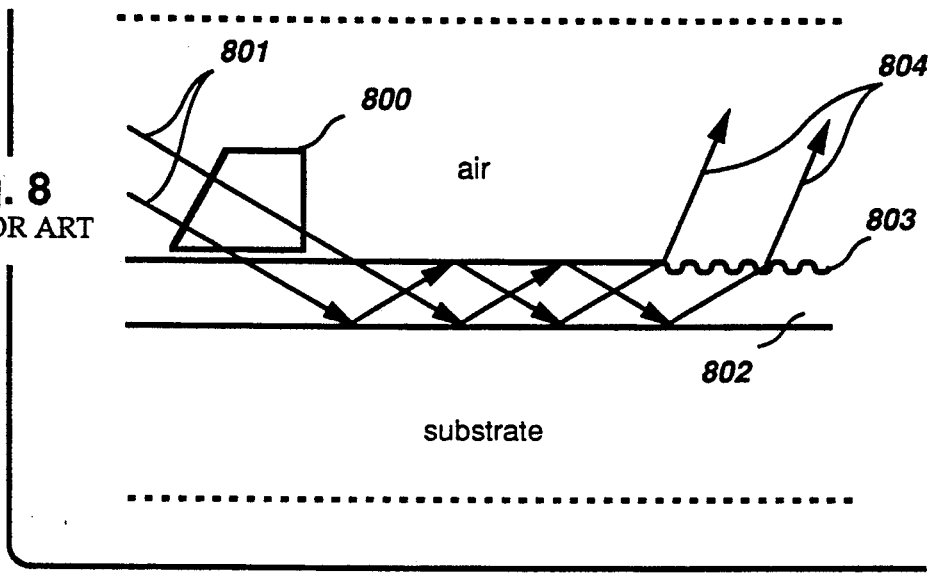
FIG. 8 shows prior art prism input coupling and grating output coupling of an external light beam into a thin-film waveguide.
Figure 9:
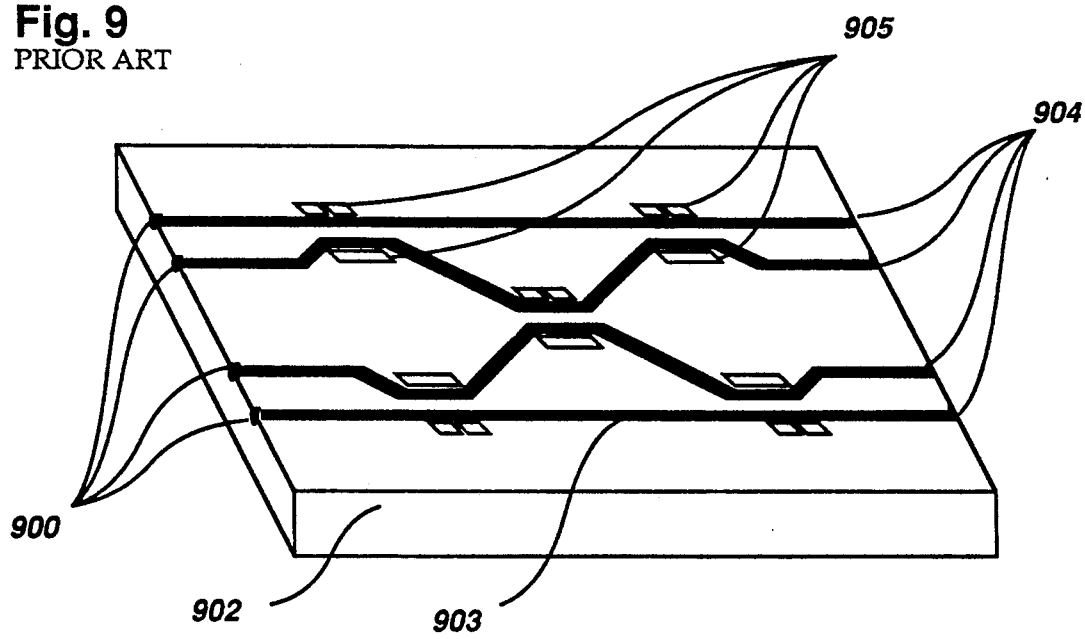
FIG. 9 shows a prior art "4 by 4" directional coupler switch.
Figure 10A:
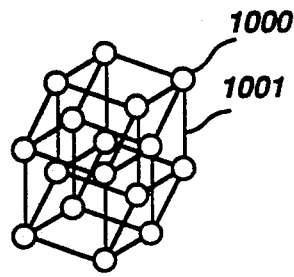
FIGS. 10A-10B are prior art diagrams of a four-dimensional hypercube.
Figure 10B:
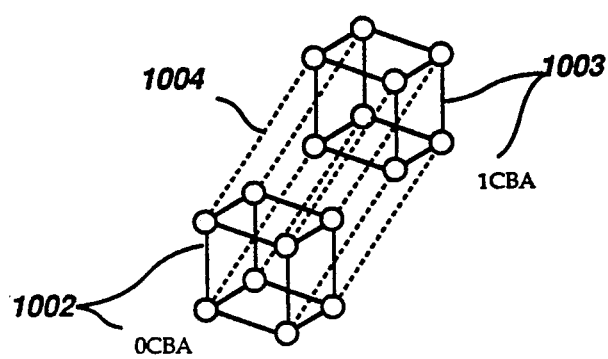

Reference will now be made in detail to the present preferred embodiments of the invention, examples of which are illustrated in the accompanying drawings, wherein like reference numerals indicate like elements throughout the several views.

Given the intellectual process of system description, the present invention mechanizes a novel representation of that system's description. Object descriptions have meaning, that is, they refer to or describe some system with certain physical or conceptual properties.

For color graphics, the objects may be particular color sensations described in terms of attributes such as: red; green; blue; which define a color space. For optical communications, the objects may be a particular coherent light source described in terms of its lightwave components, which define a signal space. The significant aspect of system description is that the actual description is one selected from a set possible descriptions. The invention is a general apparatus and method, designed to operate for each possible problem selection, not just the one which will actually be chosen since this is unknown at the time of design.

The process of the present invention enables representing sensed physical phenomena logically and logical objects visually. Most of the prior art methods referred to in Description of the Prior Art sought to visualize some aspect of a problem-solving process by mapping logical object descriptions onto visual space.

Most prior art methods assume visual space to be the Cartesian space, in that, logical objects are mapped onto the real line, the plane, or the cubic space. An object's location in visual space, accordingly, is metrically determined relative to one or more coordinate axes. Herein lies the principal departure of the present invention from these prior art methods: the method and apparatus of the present invention define a novel form of object space, such that, object location in this object space is logically, rather than metrically, determined. Other prior art methods referred to in Description of the Prior Art sought to visualize some aspect of the problem-solving process by recursive indexing on some variant thereof. Such prior art methods, however, determine locations by decomposing a domain.

The process which transforms an object description into an object space is directed by object descriptions in accordance with the method of the present invention. Object expressions are represented by a unique binary-coded name which directly correspond to a position in the object space of the present invention. The present invention is first described as the method of reflecting binary N-dimensional object spaces. Then the present invention is described as the generalized method of reflecting mixed-resolution, N-dimensional object spaces. The process of the present invention results in an interleaving of the N-dimensions. Bit interleaving is often employed in structuring data, as well as part of the data representation itself. Samet in his book, *The Design and Analysis of Spatial Data Structures*, 1989, Addison Wesley, N.Y., p. 109, states:

... bit interleaving makes it possible to balance a data base of multidimensional point data dynamically. It leads to logarithmic insertion, deletion and search algorithms. It does have drawbacks, however. First, and most serious, is that bit interleaving is not performed efficiently on general computers. Its complexity depends on the total number of bits in the keys.

Because efficient interleaving of binary-coded data is essential to the visualization process described herein, an embodiment of the invention is described as an apparatus with a virtual component. Before describing an embodiment of the invention in detail the following terminology is defined:

1. Object: a structural and/or behavioral expression of some real-world or imaginary phenomenon.

2. Object descriptor: a collection of interleaved logically encoded attributes which describes a schema for a particular kind of object expression describing the object space.

3. Object selector: a collection of interleaved logically encoded attribute values associated with the descriptor of a specific object expression, defining a location in the object space which names a specific attribute relation.

4. Object space: an expression of bit-interleaved names for the set of possible relationships between a plurality of attributes which describe some real-world or imaginary phenomenon.

5. Object name: a logically encoded representation of an object selector in an object space.

6. Visual space: a graphical expression for a logical space or object names projected onto a plane.

7. Dimension: each attribute of an object descriptor which corresponds to a dimension in both object space and visual space.

8. Dimensional resolution: the range of values associated with each attribute of an object descriptor.

9. Quantization: assigning a logical name to a range of values.

10. Object Frame: describes the format of an object descriptor, where each attribute (dimension) is denoted by a "1" followed by "Os" representing the additional bits of binary resolution.

Frame Data: a collection of concatenated attribute values corresponding to their respective bit positions in an object frame.

The present invention provides a process for visualizing N-dimensional, object space using a computing device such as a computer. The computing device may be of the type comprising means for inputting storing and processing data and commands, means for generating a logical representation of the N-dimensional object space in response to the stored data and commands, frame logic for generating a virtual image representing the N-dimensional, object space in response to the stored data and commands, and display means for displaying a visible representation of the virtual image. The process uses the computing device.

Figure 11A:
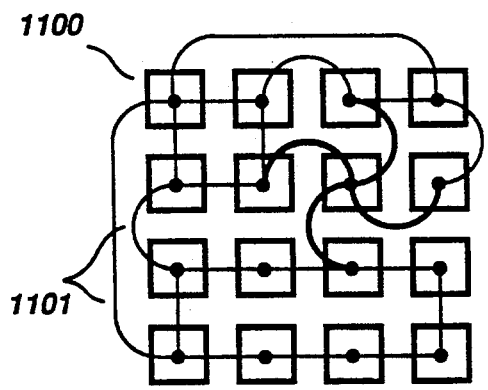
FIGS. 11A-11C show an intuitive procedure for generating spaces, spatial element linkage, and a binary 4-cube projected onto a plane.
Figure 11B:
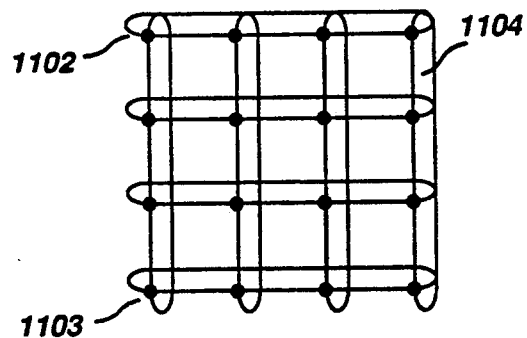
Figure 11C:
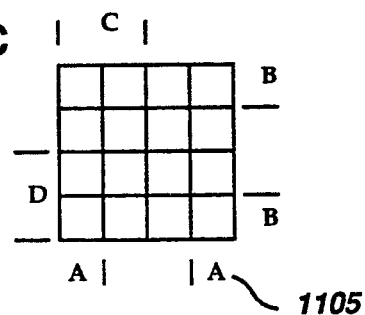
Figure 12:
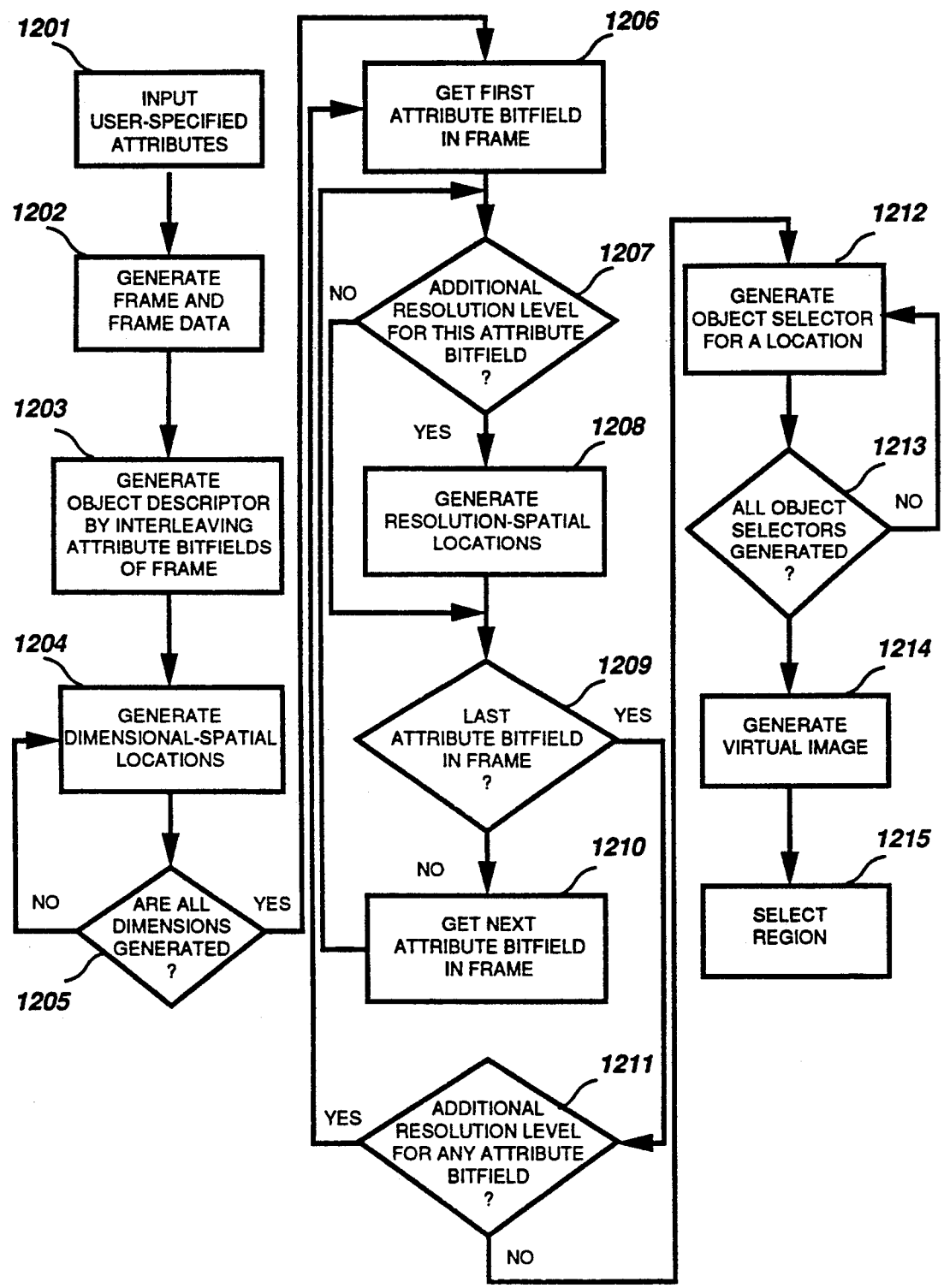
FIG. 12 is a flow chart for the case of user-specified attributes which shows the process of the invention.

FIGS. 11A-11C show an intuitive procedure for reflecting a mixed-resolution, 4-dimensional, object space onto a plane Referring to FIG. 12, a flow chart showing the case for user-specified attributes, the process starts with the step of inputting the attributes 1201 to the computing device. The attributes describe the problem. A color display, for example, may have the attributes of three primary colors: red; green; and blue. Each attribute corresponds to a dimension of the problem. For the color display, each of the three primary colors may be considered a dimension, giving a dimension of three ($N=3$). The computer generates 1202, from the user specified attributes, a frame for the N-dimensional object space. The frame is a coded representation of attribute descriptions for a particular problem domain. In a color space each attribute corresponding to a primary hue is described by a bitfield in the frame. The first bit of each bitfield is always a logical one. Subsequent bits in a given bitfield are logical zeros. Each logical zero represents an additional bit of resolution.

As a first example, a three-dimensional object space, with two bits resolution on each dimension would have a frame (0, 1, 0, 1, 0, 1). Each 1-bit represents each dimension, and the 0-bit placed before the corresponding 1-bit indicates a second bit of resolution. For the color display, two bits of resolution on each of three dimensions might correspond to four levels of intensity for each of the primary colors.

As a second example, a three-dimensional, object space with three bits of resolution on the first dimension, one bit of resolution on the second dimension, and two bits of resolution on the third dimension, would have the frame: (0, 1, 1, 0, 0, 1). For color space: the right three bits might represent eight levels of resolution or saturation of the red attribute; the center bit might represent two levels resolution or saturation of the green attribute; and the left two bits might represent four levels of resolution or saturation of the blue attribute.

As a third example, for a three dimensional, object space with one bit resolution on each dimension would have a frame (1, 1, 1). Each bit, from right to left, might represent the red attribute, the green attribute and the blue attribute, respectively. The frame is a positional notation which denotes the number of attributes and the resolution of each attribute. The frame data are the values or sense of each bit position in a given frame.

Referring to FIG. 12, the bits of the frame are interleaved 1203 to generate an object descriptor. For the first example, the object descriptor is (0, 0, 0, 1, 1, 1) for the frame (0, 1, 0, 1, 0, 1). For the second example, the object descriptor is (0, 0, 0, 1, 1, 1) for the frame (0, 1, 1, 0, 0, 1). For the third example, the object descriptor is (1, 1, 1) for the frame (1, 1, 1). The computing device generates 1204 from the frame and the object descriptor, dimensional-spatial locations of the N-dimensional object space. For each 1-bit from the object description, the computing device generates a dimension of dimensional-spatial locations. The dimensional-spatial locations correspond to the attributes of the problem.

FIGS. 13 through 19 illustrate n-cube projection in accordance with methods of the invention now further described as a process to mechanize and visualize reflected N-dimensional-object spaces for any N, where N is a positive integer. It should be noted that each of the FIGS. 13 through 19 show three expressions of n-cube element configurations.

The n-cube of FIGS. 13A-13C is referred to herein as a 0-dimensional object space. FIGS. 13A-13C show that an object space with a dimension of zero (n=0) has only one element; that is, one dimensional-spatial location.

The binary 1-cube of FIGS. 14A-14C is referred to herein as a 1-dimensional object space with one bit of resolution. FIGS. 14A-14C show that an object space with a dimension of one (n=1) has two elements; that is, two dimensional-spatial locations. The 1-d, 1-bit object space of FIGS. 14A-14C can be visualized as a linear region comprising two elements "named" logical zero and logical one, respectively. The linear region of FIGS. 14A-14C is generated by reflecting a first 0-dimensional object space named "0" to the right. Thereby, a second 0-dimensional object space named "0" is produced. The name of a dimensional-spatial location is called an object selector.

FIGS. 15 through 19 show the progressive projection of reflected binary n-cubes, where N varies from two to six. In FIGS. 15 through 19, each dimensional-spatial location is represented as a cell, which is drawn as a square. N-dimensional object spaces are reflected as regions in an orthogonal direction determined by control signals from an apparatus described below. Referring to FIGS. 15 through 19, it should be noted that the values of the n-1 rightmost object selector bits in a second (reflected) region are the same as the n-1 rightmost object selector bits of the corresponding object selectors which comprise a first region (i.e, where N is the number of bits in an object selector). It should be further noted that the value of the leftmost object selector bit of a first region is always a logical zero, and the leftmost selector bit of a second region is always a logical one.

The binary 2-cube of FIGS. 15A-15C is referred to herein as a 2-dimensional object space with one bit of resolution. FIGS. 15A-15C show that an object space with a dimension of two (n=2) has four elements; that is, dimensional-spatial locations. The 2-dimensional, 1-bit object space of FIGS. 15A-15C can be visualized as two linear regions comprising four elements "named" in accordance with a reflected binary Gray code (e.g., 00, 01, 11, 10). The object space of FIGS. 15A-15C is generated by reflecting a first linear region upward. Thereby, producing a second (reflected) linear region. The resulting object space can be visualized as a square region. It should be noted that the corresponding object selectors in each linear region have the same value in the rightmost bit position; however, the values differ in the leftmost bit position. The leftmost bit of the first linear region's object selectors is a logical zero. The leftmost bit of the second (reflected) linear region's object selectors is a logical one.

The binary 3-cube of FIGS. 16A-16C is referred to herein as a 3-dimensional object space with one bit of resolution. FIGS. 16A-16C show that an object space with a dimension of three (n=3) has eight elements; that is, dimensional-spatial locations. The 3-dimensional, 1-bit object space of FIGS. 16A-16C can be visualized as two square regions, each comprising four elements. These eight elements are named in accordance with a reflected binary Gray code (e.g., 000, 001, 011, 010, 110, 111, 101, 100). The object space of FIGS. 16A-16C is generated by reflecting a first square region comprising four elements to the left. Thereby, a second square (reflected) region is produced. It should be noted that the values of the two rightmost object selector bits in the second (reflected) square region are the same as the two rightmost bits of the corresponding object selectors, which comprise the first square region. The value of the leftmost object selector bit of the first square region is a logical zero. The value of the leftmost object selector bit of the second square region is a logical one.

The binary 4-cube of FIGS. 17A-17C is referred to herein as a 4-dimensional object space with one bit of resolution. FIGS. 17A-17C show that an object space with a dimension of four (n=4) has sixteen elements; that is, dimensional-spatial locations. The 4-dimensional, 1-bit object space of FIGS. 17A-17C can be visualized as two rectangular regions, each comprising eight elements. These sixteen elements are named in accordance with a reflected binary Gray code. The object space of FIGS. 17A-17C is generated by reflecting a first rectangular region comprising eight elements downward. Thereby, a second rectangular (reflected) region is produced.

Figure 18A:
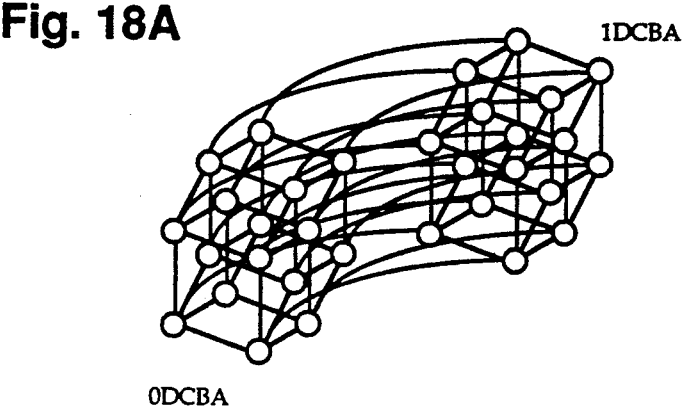
Figure 18B:
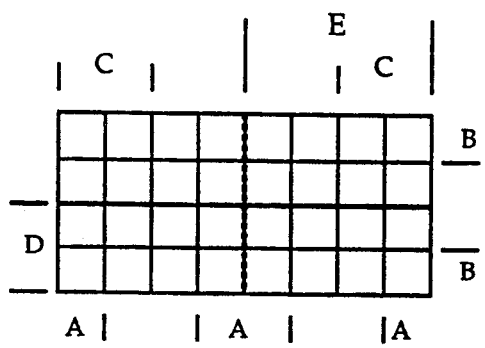
Figure 18C:
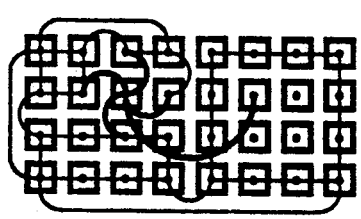

The binary 5-cube of FIGS. 18A-18C is referred to herein as a 5-dimensional object space with one bit of resolution. FIGS. 18A-18C show that an object space with a dimension of five (n=5) has thirty-two elements; that is, dimensional-spatial locations. The 5-dimensional, 1-bit object space of FIGS. 18A-18C can be visualized as two square regions, each comprising sixteen elements. These thirty-two elements are named as described above in accordance with a reflected binary Gray code. The object space of FIGS. 18A-18C is generated by reflecting a first square region comprising sixteen elements to the right. Thereby, a second square (reflected) region is produced.

Figure 19A:
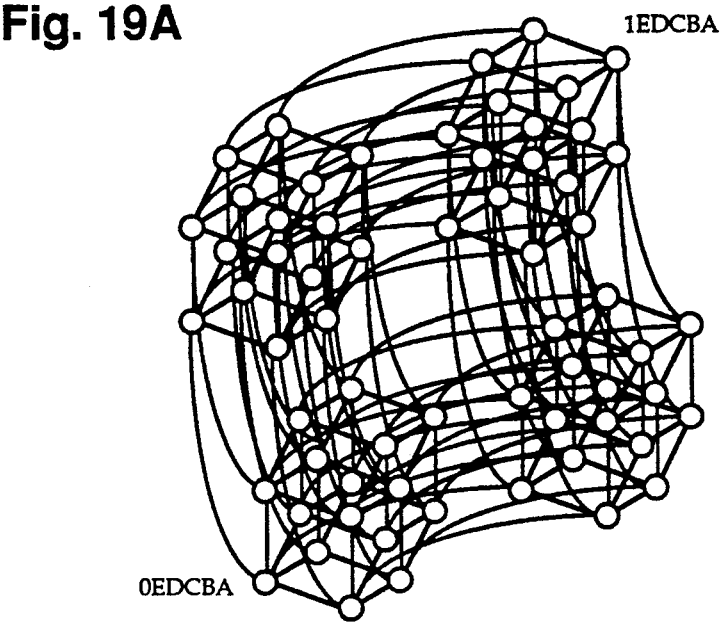
FIGS. 19A-19C show expressions of a six-dimensional, object space.
Figure 19B:
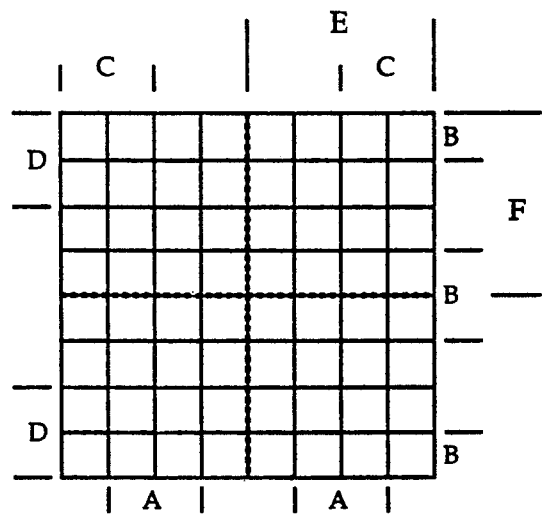
Figure 19C:
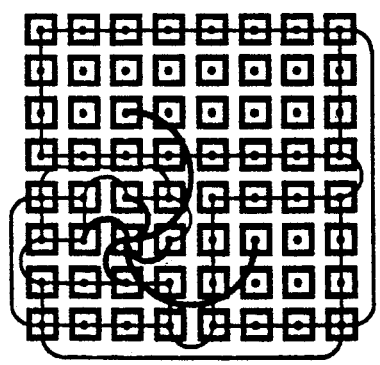

The binary 6-cube is FIGS. 19A-19C is referred to herein as a 6-dimensional object space with one bit of resolution. FIGS. 19A-19C show that an object space with a dimension of six (n=6) has sixty-four elements; that is, dimensional-spatial locations. The 6-dimensional, 1-bit object space of FIGS. 19A-19C can be visualized as two rectangular regions, each comprising thirty-two elements. These sixty-four elements are named in accordance with a reflected binary Gray code as described above. The object space of FIGS. 19A-19C by reflecting a first rectangular region comprising thirty-two elements upward. Thereby, a second rectangular (reflected) region is produced.

The process of naming spatial elements for any N-dimensional space is intuitively understood as a "function" of reflecting its subspaces. The space generation method illustrated by FIGS. 13 through 19, when projected onto a plane, results in a two-dimensional visual representation of reflected N-dimensional spaces. The novel method of the present invention can be used for visualizing progressive space generation for any N-dimensional, object space.

The dimensional-spatial locations can be produced by reflecting cells right, up, left, down, right, up, left, down, etc., in what is considered a counter-clockwise direction. Alternatively, the dimensional-spatial locations can be produced by reflecting cells to the left, up, right, down, left, up, right, down, etc., in what is considered a clockwise direction. The dimensional-spatial locations may be reflected in a clockwise or counter-clockwise direction. Further, the dimensional-spatial locations can be produced by reflecting cells in a single direction or selected direction. For illustrative purposes the counter-clockwise embodiment for producing dimensional-spatial locations is used throughout this disclosure, with the understanding that the alternative embodiments produce semantically equivalent dimensional-spatial locations.

Referring to FIG. 12, when all the dimensional-spatial locations are generated 1205 representing all the dimensions of the problem, then the computing device gets 1206 the first attribute bitfield in the frame. From this bitfield, the computing device determines 1207 whether resolution-spatial locations need to be generated from this bitfield. If no resolution-spatial locations are to be generated, then the computing device determines 1206 whether this is the last bitfield of the frame. If yes, then the computing device checks 1211 if there are any additional resolution-spatial locations to be generated for any bitfield. If no resolution levels are required, then the computing device generates 1212 an object selector which corresponds to interleaved frame data for each dimensional-spatial location in the N-dimensional object space. The object selectors are an interleaved bitfield of the frame data. The object selectors define a location in the cells representing the dimensional-spatial locations.

If all object selectors have been generated 1213 for all the dimensional-spatial locations for the N-dimensional, object space, then the computing device generates 1214 a virtual image of the N-dimensional, object space from the dimensional-spatial locations and the object selectors. A user or application procedure may select 1215 a logical region of the virtual image for machine control, display, or other application-driven function. The process further may include using the computing device for displaying the selected logical region of the virtual image of the N-dimensional, object space on the display means. The process additionally may use the computing device for generating 1208, from the frame and the object descriptor, resolution-spatial locations for resolution levels of each of the N dimensions for a mixed-resolution, N-dimensional, object space.

FIGS. 20-22 illustratively show the generation of resolution-spatial locations. Referring to FIG. 20, the number of elements in a k-ary 1-cube is determined by the number of bits of resolution as a power of two. For example, a 4-ary 1-cube with two bits of resolution has four elements and an 8-ary 1-cube with three bits of resolution has eight elements. When elements of k-ary 1-cubes are reflected linearly as shown in FIGS. 20A-20C, the element transition sequences correspond to the primary form of the reflected binary code, but may be interpreted as a reflected k-ary code.

Figure 20A:
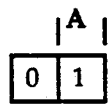
FIGS. 20A-20C are diagrams of a k-ary one-dimensional, object space.

FIG. 20A shows a binary 1-cube referred to herein as a 1-dimensional object space with one bit of resolution. The 1-dimensional, 1-bit object space of FIG. 20A comprises two object selectors named "0" and "1" respectively. The object selectors of a 1-dimensional, 1-bit object space represent dimensional-spatial locations.

Figure 20B:
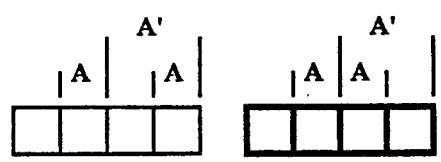
Figure 20B:
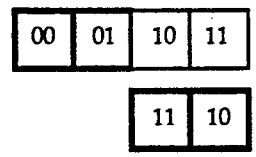

FIG. 20B illustrates a 1-dimensional object space with two bits of resolutions. In this case, the original dimensional-spatial locations of FIG. 20A have been reflected to the right to increase the resolution in the direction of the first dimension. Note that the reflection for increased resolution is in the same direction as the reflection which generated the dimension. The object selectors of the original dimensional-spatial locations have a 0-bit placed in front of them, and the newly generated resolution-spatial locations have the original object selectors reflected therein with a 1-bit placed in front of them.

Figure 20C:
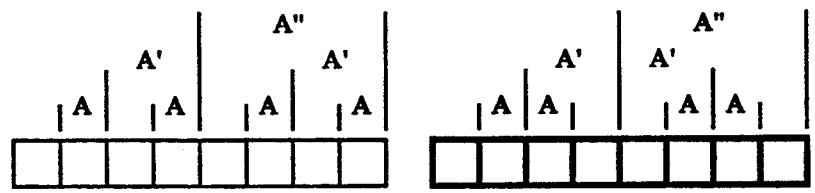
Figure 20C:
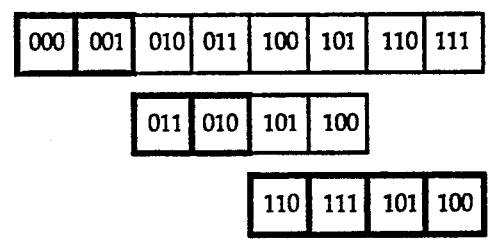

FIG. 20C shows a 1-dimensional object space with three bits of resolution, which has been generated from the 1-dimensional, 2-bit object space of FIG. 20B. In this case object selectors from the 1-dimensional, 2-bit object space (2-ary 1-cube), have a 0-bit placed in front of them, and the object selectors generated by reflection have a 1-bit placed in front of them.

Figure 21A:
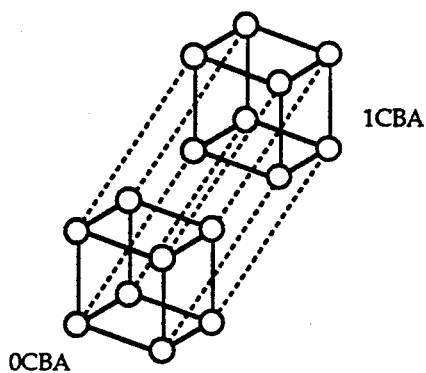
FIGS. 21A-21B are diagrams of 4-dimensional object spaces.
Figure 21B:
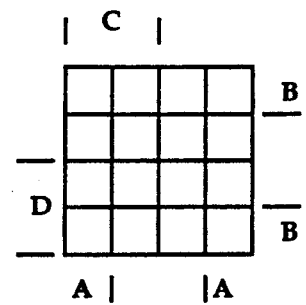
Figure 21C:
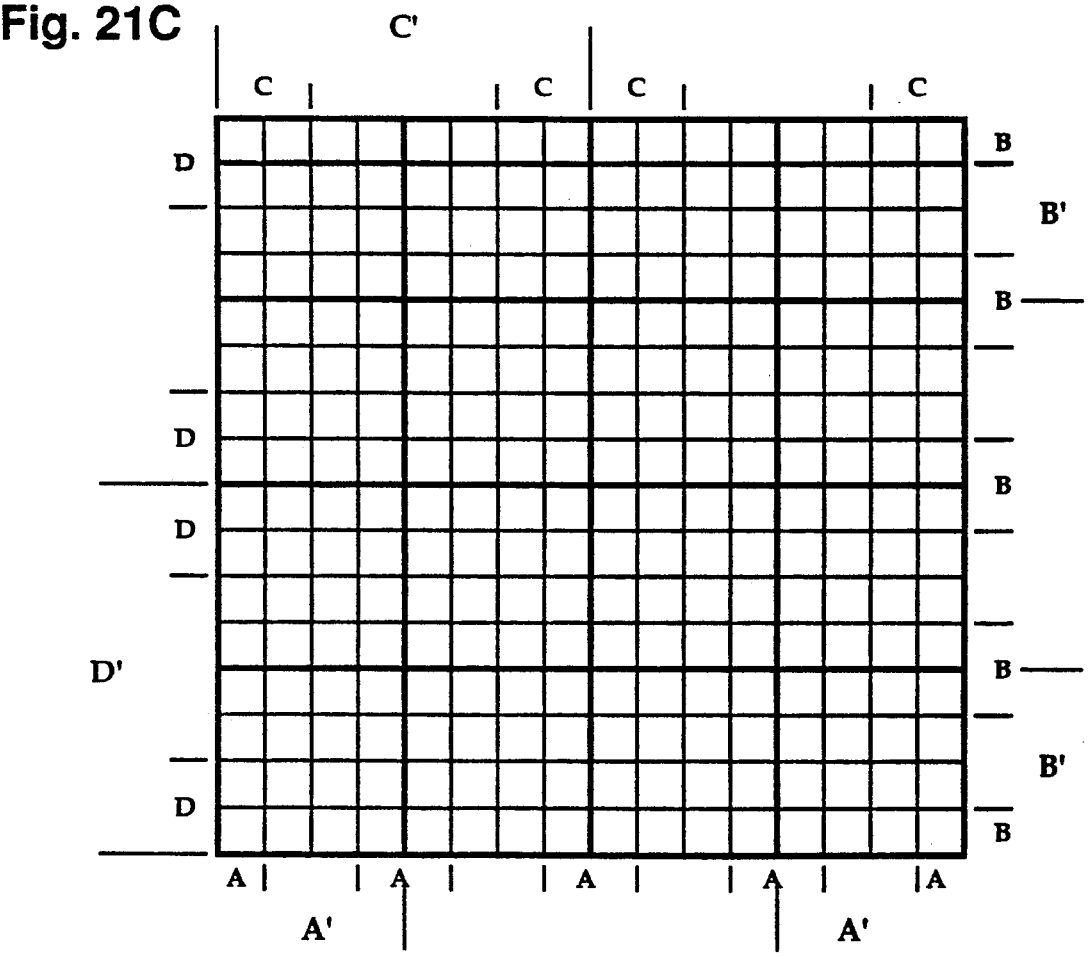

FIGS. 21A-21C are diagrams of 4-dimensional object spaces. FIGS. 21A-21B shows a 4-dimensional object space with one bit of resolution. FIG. 21C shows a 4-dimensional object space with two bits of resolution, in each dimension. In this case, after generating all of the dimensional-spatial locations for the four dimensions, the resolution-spatial locations are generated. Accordingly, the sixteen dimensional-spatial locations for the four dimensions are reflected initially to the right to generate two levels of resolution for the first dimension. At this stage, there are thirty-two dimensional-spatial locations and resolution-spatial locations. To generate two levels of resolution in the second dimension, thirty-two resolution-spatial locations are generated by reflecting in an upward direction the combination of thirty-two dimensional-spatial locations and resolution-spatial locations. Now there are a total of sixty-four spatial locations. The two level resolution-spatial locations for the third dimension are generated by reflecting sixty-four resolution-spatial locations to the left of the previously generated sixty-four spatial locations. The two level resolution-spatial locations may be generated for the fourth dimension by reflecting 128 resolution-spatial locations in a downward direction from the mixture of 128 mixed-resolution spatial locations from the first, second, and third dimensions. Accordingly, a total of 256 spatial locations are generated for the 4d, 2-bit object space. Object selectors are generated in a similar fashion as previously described for each mixed-resolution spatial location.

Figure 22A:
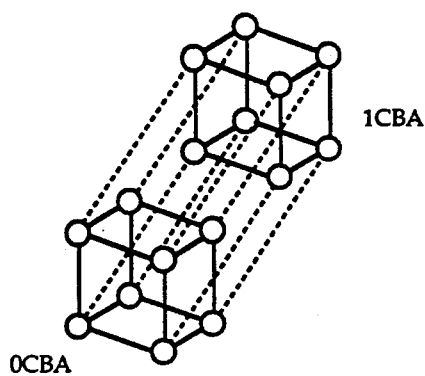
FIGS. 22A-22C are diagrams of a mixed-resolution, 4-dimensional object space derived from a binary, 4-dimensional object space.
Figure 22B:
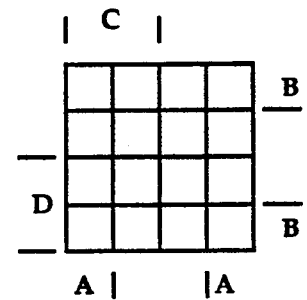
Figure 22C:
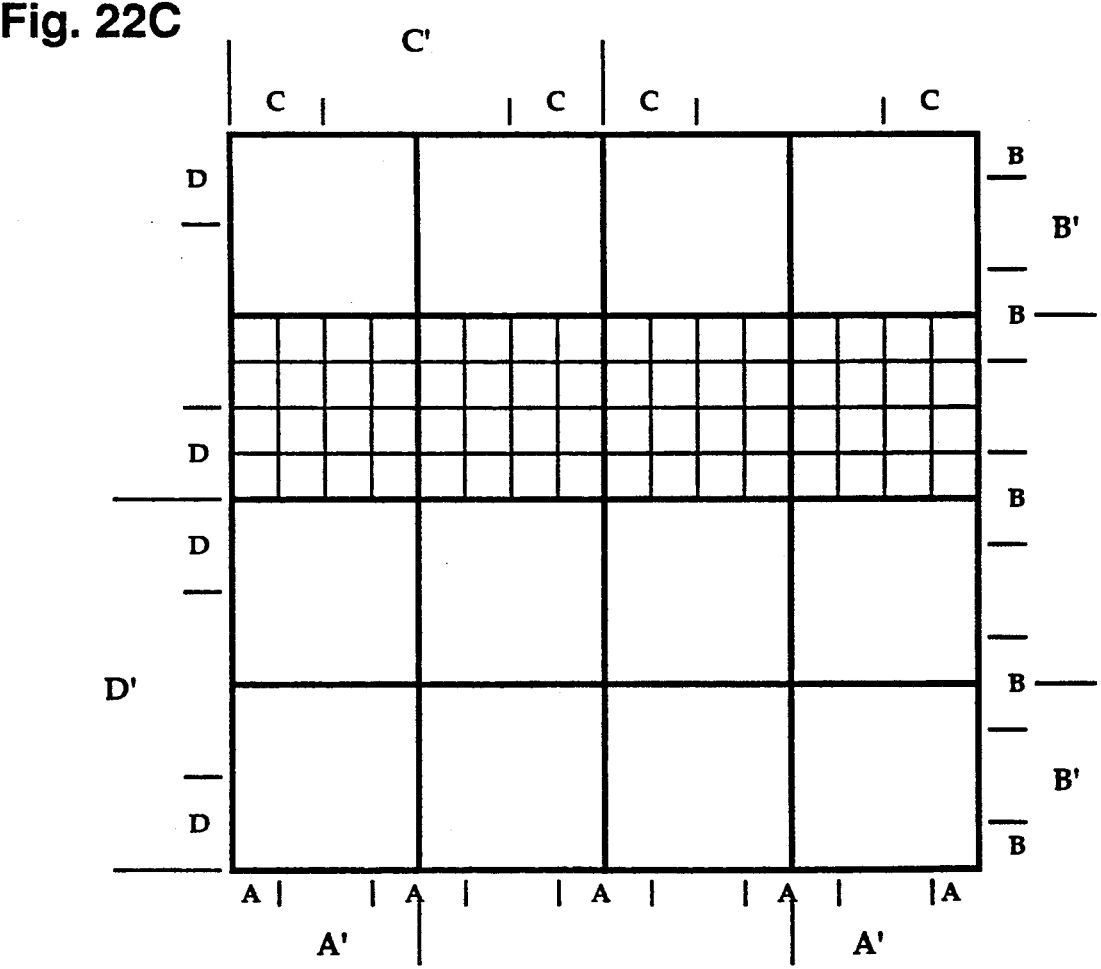

FIGS. 22A-22C, are diagrams of a mixed-resolution, 4-dimensional object space derived from a binary, 4-dimensional object space. FIGS. 22A-22C again shows the 4-dimensional object space with one bit of resolution.

FIG. 22C shows a mixed-resolution, 4-dimensional object space. In a mixed-resolution object space the number of bits of resolution for each dimension is permitted to differ. Prior art methods for naming elements of an object space can be characterized as container-oriented in that the number of addressable element locations are a function of the container's extent. Alternatively, the method disclosed herein is characterized as content-addressable, in that, the extent and configuration of an object space is a function of its contents. In the object space of FIG. 22C the first and third dimensions each have two bits of resolution and the second and fourth dimensions have only one bit of resolution. Therefore, the object selectors for the object space of FIG. 22C have a total of six bits. Recall that the number of bits in an object selector, when viewed as a power of two, describes the number of elements in a given object space. Therefore, the object space of FIG. 22C comprises sixty-four elements. It should be noted that prior art representations of higher-dimensional spaces typically fix the resolution for each dimension relative to the greatest number of bits required for any dimension. Thereby, an inefficient spatial representation is created. The method of the present invention generates logical object spaces by a process which relies on a novel object description rather than a process of spatial decomposition. In the case of FIG. 22C, the dimensional-spatial locations for one bit of resolution in each of the four dimensions are generated. Then, the resolution-spatial locations for the first and the third dimensions are generated. Sixteen dimensional-spatial locations comprise a first square region. A first square region of sixteen elements is reflected to the right; thereby, producing a second (reflected) square region. The direction (right) of reflection is determined by the additional bit of resolution in the first dimension. This step results in a rectangular region comprising thirty-two elements. The second dimension has no additional bits of resolution and the next orthogonal direction (upward) is bypassed. The third dimension, however, has an additional bit of resolution. Therefore, the rectangular region comprising thirty-two elements is reflected in the next orthogonal direction (left). Thereby a second (reflected) rectangular region is produced. The resulting first and second (reflected) regions account for the sixty-four elements shown in the object space of FIG. 22C.

Given an object space description where one or more dimensions have two or more bits of resolution (e.g., a k-ary object space, the object selectors describe a novel form of reflected Gray code called the k-ary reflected Gray code. An object selector is generated 1212, as illustrated in FIG. 12, for each resolution-spatial location in the mixed-resolution, N-dimensional object space. When all object selectors are generated 1213, from the resolution-spatial locations, the dimensional-spatial locations and the object selectors, a virtual image is generated 1214 of the N-dimensional object space. A user or machine may select 1215 a logical region of the virtual image for use or display. The computing device may display the selected logical region of the virtual image of the mixed-resolution, N-dimensional object space on the display means.

Figure 23:
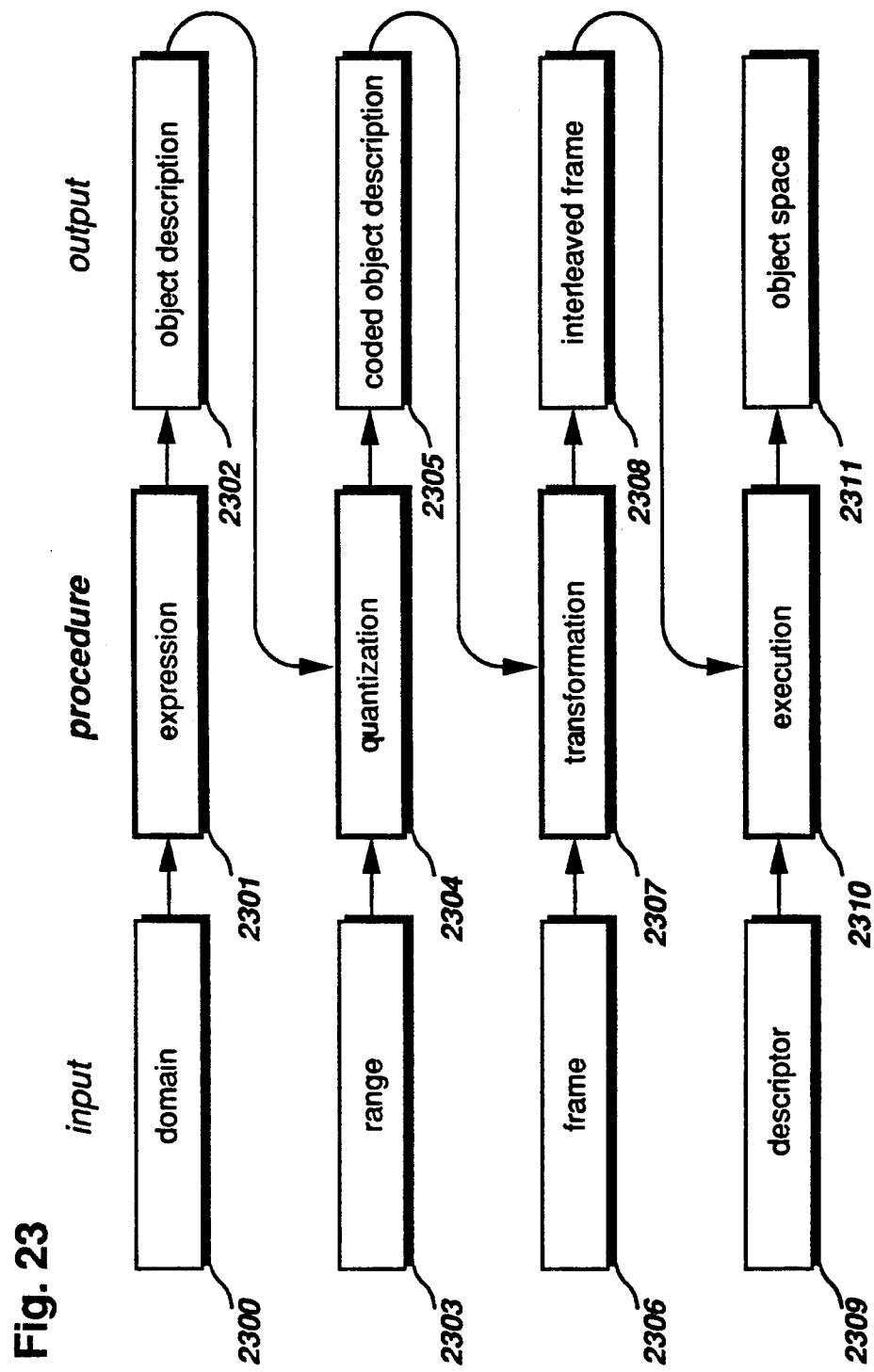
FIG. 23 is a functional diagram of the object description process.

FIG. 23 shows a functional diagram of the object description process. Four procedures comprise the object description process: expression 2301; quantization 2304; transformation 2307; and execution 2310. In the case of user-specified attributes a user inputs a domain 2300 of an object which is expressed 2301 as an object description 2302. The object description is encoded as a set of attributes. Each attribute selected corresponds to one dimension of an N-dimensional, object space. The order in which the attributes are specified determines a sequence in which an object space is generated.

The range 2303 of possible values of each attribute is encoded by a quantization 2304 procedure which assigns a logical digital code to range 2303 of values. The resolution is the degree of range 2303 of values. The degree of range compression (e.g., scaling of values) is part of the attribute specification. Coded attribute values correspond to the transition sequence of a reflected binary code. Intuitively, the most straightforward way of naming or coding an ordered set of objects, where each codeword is a unique sequence of binary digits, is to count in binary, but consecutive codewords usually differ by more than one bit position. Some forms of the reflected binary code, referenced above in the Description of the Prior Art, offer special advantages over others for particular applications. The maximum number of bits required to represent a coded attribute value defines its dimensional resolution.

The range 2303 of values associated with each dimension of the object description 2303 is quantized 2304 to form a coded object description 2305, called a frame 2306. The format of a frame 2306 is a bit pattern read from the right that represents a contiguous sequence of coded attributes or bitfields. The rightmost bit of each attribute's bitfield is a logical one denoting a spatial dimension. Additional bits of resolution for a given attribute, if any, are assigned a logical zero; e.g., (0 1, 0, 1) is a frame 2300 for coded object description representing two four-valued attributes.

The bits of the object frame 2306 are then transformed 2307 to form an interleaved object 2308 called a descriptor 2309. The object descriptor represents the name format for specific object expressions. A collection of coded attribute values associated with the interleaved from 2308 of a named object expression is called an object selector. The object descriptor 2309 controls the execution process 2310 for forming a visual space 2311. The bitwise control sequence can be understood by considering the interleaved object frame 2306 in an expanded form. The number of dimensions N describing a unit object space is defined in the first interval of the expanded frame. Each subsequent interval extends the dimensional resolution of the object space 2311. A blank interval position in the expanded object descriptor 2309 may be thought of as the termination of the spatial control sequence for that particular dimension.

The object spaces shown in FIGS. 14 through 19 are simple enough to be formed manually and, in a few instances, mentally; however, description spaces of actual systems quickly exceed the feasible limits of mental visualization and manual procedures. Therefore, an embodiment of the present invention is described as an electronic controller. It should be understood that the control of various types of machines and application processes are contemplated within the scope of this invention. A frame controller is the syntactic expression of a visual space. A region controller is part virtual machine which determines semantic expression of an object space as a name space.

Given a user-specified set of attributes defining dimensions and resolution levels in a particular object space, an illustrative embodiment of an object description system comprises a plurality of physical modules which may be operatively coupled in various logical configurations to efficiently mechanize the method of the present invention. There are two kinds of physical modules in an illustrative embodiment of an object description system: modules of a host computing device and object modules operatively coupled to modules of a host computing device.

Figure 24A:
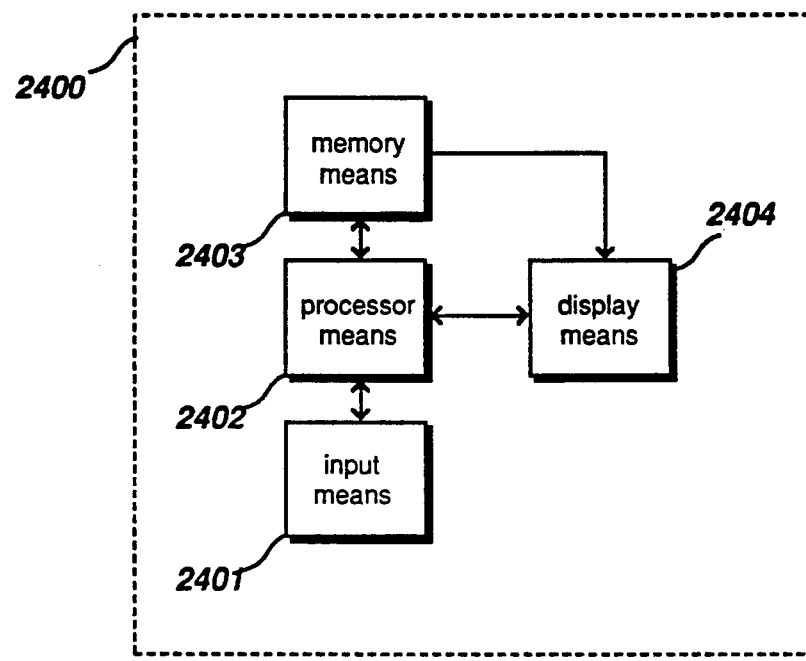
FIGS. 24A-24B show block diagrams of physical modules in an object description system.

Referring to FIG. 24A, a computing device 2400 is shown including an input device 2401, a processor 2402, memory 2403, and a display device 2404. The input device 2401, by way of example, may be a key board, computer port, or an application within a computer. The processor 2402 is coupled between the input device 2401, memory 2403 and display device 2404.

Figure 24B:
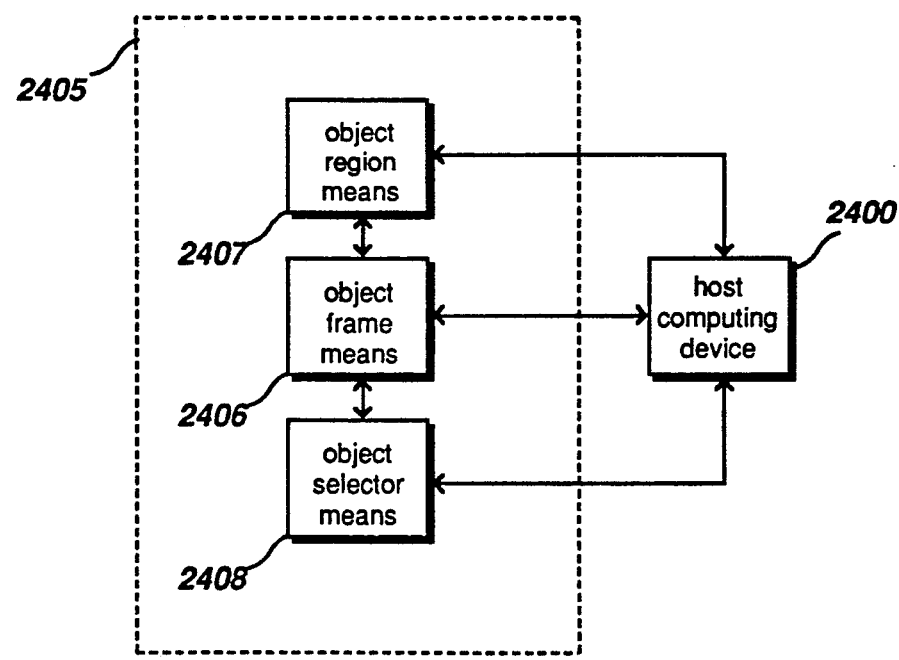

FIG. 24B shows object module 2405 having object frame module 2406, object region module 2407, and object selector module 2408 operatively coupled to the computing device 2400. Each object module 2405 comprises at least one register device having at least one storage cell; combinational logic devices which relate to the registers; data signal paths which link devices within a module and which link devices in different modules; and control signal paths which link devices within a module and which link devices in different modules. The region module 2407 is operatively coupled to the input logic of the computing device 2 and the object frame module 2406. The object region logic 2407 is used for selecting relations of the virtual image.

As with the process of the present invention, a user may specify semantic expressions for a particular set of attributes defining dimensions and resolution levels in the object space. A user, using the input device 2401 inputs the semantic expressions for the particular set of attributes of a problem for the mixed-resolution, N-dimensional, object space. The input logic of the processor 2402 is operatively coupled to the input device 2401 and interfaces the input device 2401 with the memory 2403.

The frame logic 2407 interleaves the frame to generate an object descriptor. The frame logic 2407 also generates, from the frame and the object descriptor, dimensional-spatial locations for N dimensions. From the frame and the object descriptor, the frame logic 2407 generates resolution-spatial locations for resolution levels of each of the N dimensions of the mixed-resolution, N dimensional object space.

The frame logic 2407 uses frame data to generate, for a particular spatial location, an object selector. The object selector as previously described conforms to a primary form of a reflected binary code. Using the dimensional-spatial locations and the object selectors, the frame logic 2407 generates a virtual image of the N-dimensional, object space. The computing device using region logic 2408 manipulates the virtual image with bit selectors.

The apparatus of the present invention may be used for visualizing a mixed-resolution, N-dimensional, object space. The user specifies an object described by for a particular set of attributes defining dimensions and resolution levels in the object space. The user inputs the object description for the N-dimensional, object space using the input device 2401. The frame module 2406 interleaves the frame to generate an object descriptor, and it generates dimensional-spatial locations for N dimensions from the frame and the object descriptor. The frame module 2406 also generates, for each dimensional-spatial location, an object selector. From the dimensional-spatial locations and the object selectors, the frame module 2406 also generates a virtual image of the N-dimensional object space. The region module 2407 is used for selecting one or more elements of the virtual image. The display map 2406 stores the selected region of the virtual image and display device 2410 displays the virtual image of the N-dimensional object space. The frame module 2406 generates, from the frame and the object descriptor, resolution-spatial locations for resolution levels of each of the N dimensions for a mixed-resolution, N dimensional object space.

Various logical configurations of physical modules implement the procedural behavior of an object description system. An object description system can be regarded as an implementation of procedures that transforms mixed-resolution, N-dimensional object description into a mechanical form which can be logically manipulated. An object description system also can be regarded as an implementation of procedures that transforms mixed-resolution, N-dimensional object descriptions into a perceptible form which can be presented as an image on a graphics display device.

Figure 25:
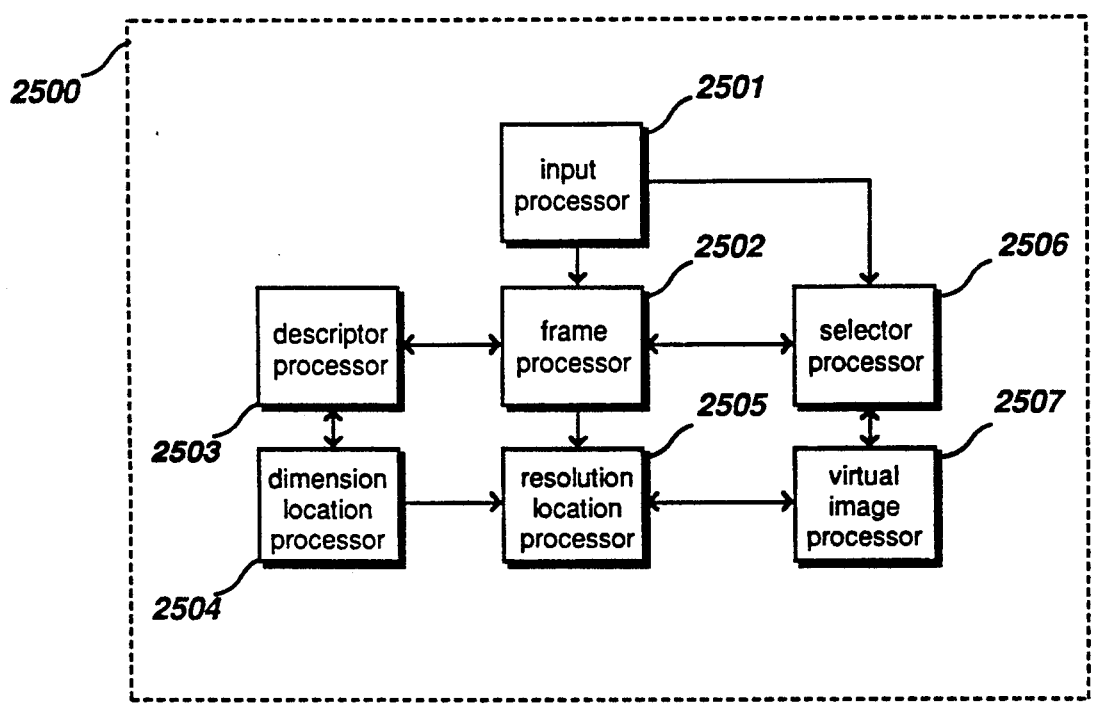
FIG. 25 shows a functional module of an object description system.
Figure 26A:
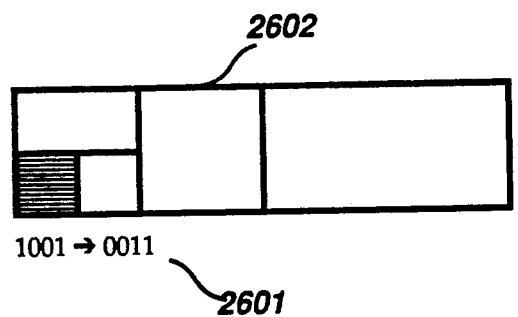
FIG. 26A-26H show the object space configurations formed by the 4-bit frame logic module.
Figure 26B:
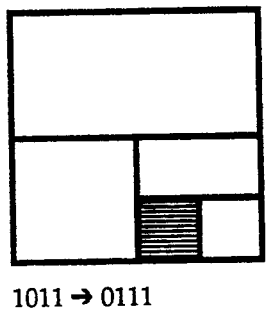
Figure 26C:
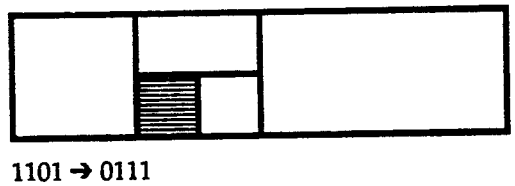
Figure 26D:
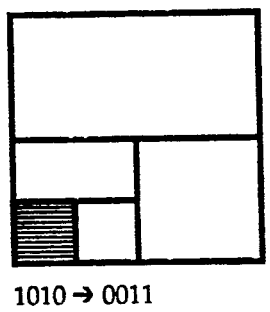
Figure 26E:
Figure 26F:
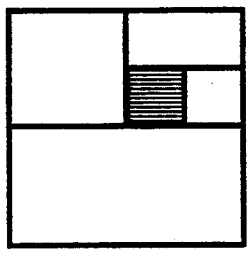
Figure 26G:
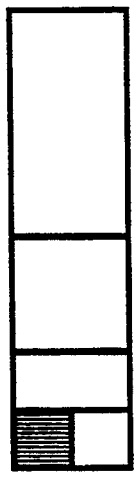
Figure 26H:
Figure 27A:
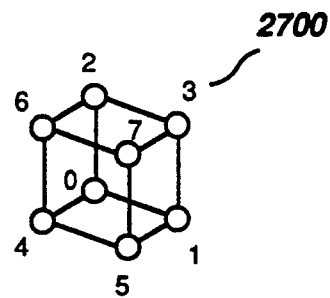
FIGS. 27A-27C are diagrams of an eight-element RGB color space.
Figure 27B:
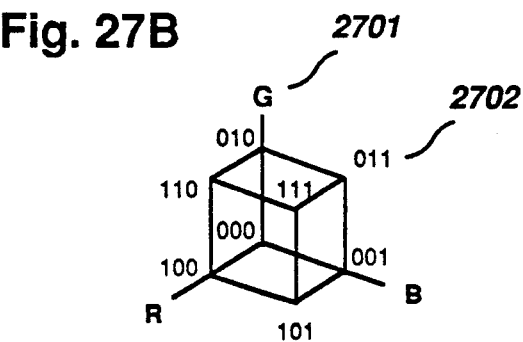
Figure 27C:
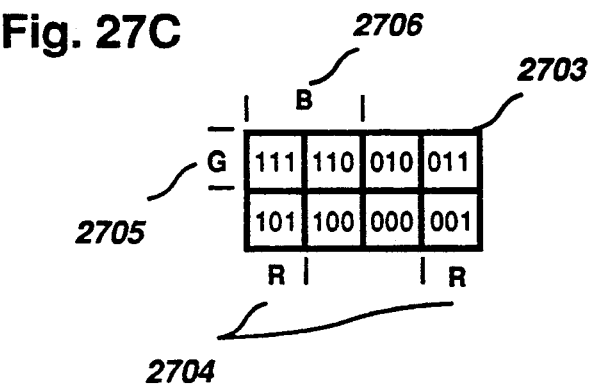

Referring to FIG. 25, these transformation procedures can be organized and abstracted into a functional model 2500 of an object description system. The functional model of an object description system comprises a plurality of logical processors, which perform the correlative functions corresponding to the reference numerals of FIG. 12:
application input processor 2501 (1201)
frame processor 2502 (1202)
descriptor processor 2503 (1203/1204)
dimension-location processor 2504 (1204/1205)
resolution-location processor 2505 (1206-1211)
selector processor 2506 (1212/1213)
virtual image processor 2507 (1214/1215)

A logical processor in the functional model corresponds to one or more physical modules, and two logical processors in the functional model may share a physical module. Similarly, representations of object spaces may exist in one or more different memories. Alternatively, a plurality of such object description systems may be operatively coupled in various logical configurations dictated by the conceptual problem domain, enabling concurrent manipulation of a plurality of object space descriptions or concurrent manipulation of a plurality of views of a particular object space description.

FIG. 26A-26H shows the object space configurations formed by the 4-bit frame logic module. Each object space 2602 shown in FIGS. 26A through 26H is associated with a diagram of its object frame selector 2600 and the logical names of their frame and interleaved frame 2603. The logical names of the frame and interleave frame 2601 shown in FIGS. 26E through 26H are the same, resulting in the practical observation that the object frames for these spaces are in their interleaved form.

AN ILLUSTRATIVE EMBODIMENT OF THE INVENTION

An example of an object space embodied as a uniform color space generated in accordance with the method of the present invention is now described to better understand how to practice the invention. The discussion of prior art color models referred to in Description of the Prior Art established a long felt need for a method of representing a uniform color space, such that, specific color sensations could be algorithmically specified. In particular, this example demonstrates how a range of color sensations described by an RGB color cube can be uniformly projected onto a plane. This example teaches: how to describe the attributes of an RGB color cube; how the perceptual attributes of a color specification correspond directly to the problem description process of the invention; and this example also teaches the correspondence between the problem description process of the invention and the electronic production of color sensations.

Visible light, called the physical color space, is a small segment of the continuum of electromagnetic radiation, which includes, for example, radio waves, radar, microwaves, infrared and ultraviolet light, x-rays, and gamma rays. A color representation system determines the location of a particular color sensation in a visual space, called the logical color space. The system is a color representation system; the input is white light; and the response is a color space generated in accordance with the method of the present invention.

A color representation system determines the location of a particular color sensation in a visual space called the color space. Color space expressions indirectly produce physical device control signals for a color display. The RGB color cube represents red, green, and blue primaries as orthogonal axes. The displayable colors are within the cube from (0, 0, 0) to (1, 1, 1). The neutral axis is a (diagonal) line from The black point (0, 0, 0) to the white point (1, 1, 1). The color cube has been referred to in the literature as a "natural" coordinate system in the sense that the three color components are mapped into an orthogonal coordinate system in the same fashion as three-dimensional geometry. In a chapter entitled, "Color Displays and Color Science," *Color and the Computer*, Academic Press, Boston, 1987, p. 23, the section entitled, "Visual Display Descriptive Systems," Murch makes the following observation: ". . . the location and proper specification of colors within the interior of the cube, when some real value for all three primaries is required, proves difficult."

Color specification means interactive visualization and control of the perceptual color gamuts (range of producible colors) of color display devices. An ideal color model should accomplish intuitive addressability; uniformity; independent control of lightness and chromatic contrast; display device characterization in perceptual terms; and a basis is for naming color specifications.

Intuitive addressability is the specification of color representations in perceptual terms. Perceptual specifications may include, by way of example, hue, saturation and intensity. Hue is the basic component of color and is primarily responsible for a specific color sensation (e.g., red, green, blue, etc.). Saturation is most closely related to the number of wavelengths contributing to a color sensation. Saturation depends on the relative dominance of a pure hue in a color specification. Intensity is an increased level of illumination permitting a broader range of hues to be visible.

Uniformity is the regular representation of gradations in perceived color, due to the perceptual relationship of color expressions. Independent control of lightness and chromatic contrast is the opportunity to expand chromatic contrast independently of intensity or vice versa. Display device characterization in perceptual terms chooses appropriate display representations and controls their production. A basis for naming color specifications is the opportunity to use a consistent method of color referencing to construct multidimensional models of process expressions in terms of spectral descriptors.

The illustrative example of the invention applied to the problem of color space description teaches a method for representing visual color sensations logically and reproducing logical color spaces visually. Color specification and color space organization conventionally involve levels of computational indirection between the specification of color in terms of its perceptual attributes (e.g., hue, saturation and intensity) and subsequent production of electronic color signals. The process enables the description of a logical color space expressed in terms of perceptual color attributes to be directly realized in terms of a given display device's physical color space. The approach to the problem is a descriptive specification of color space component relationships.

The domain description of a color representation system is the human visual system's response to a limited portion of the electromagnetic spectrum called visible light. Light generally refers to electromagnetic radiation from 380 nm to 770 nm. The observed color of light results from a mixture of intensities at different wavelengths. The rate of change in intensity for a given control source is a function of wavelengths. In R. Hall, *Illumination and Color in Computer Generated Imagery*, Springer-Verlag, N.Y., 1988, pp. 47–52, the graph of intensity as a function of wavelength is the spectral curve for a given test color. This graph represents a schematic for determining control light intensities for a given test color spectral curve. Each control source spectral curve corresponds to a dimensional component of the color space domain. Colors mixed in a fashion in which bands of wavelengths are added to one another is called an additive color mixture.

The illustrative RGB color space is dimensionally described in terms of three color primaries (e.g., hue=-domain dimension): high wavelength (R) red primary; medium wavelength (G) green primary; and low wavelength (B) blue primary. In an N-dimensional color space where each dimension corresponds to a color primary, the resolution of color space is determined by defining the number of values for each primary (e.g., saturation =range resolution). The range of dimensional resolution is determined by one or more bits for each dimension. The number of bits specified for each dimension may differ. Two bits of resolution (e.g., four values) are specified for each primary in the RGB color space generated below.

Value quantization can be described as spectral sampling. In the prior art spectral sampling means reducing a spectral curve to a set of sample values for subsequent color computations. Spectral sampling herein means reducing a spectral curve to a set of intensity values associated with logical names in a color space generated by the method of the present invention (e.g., intensity=value).

Generation of a logical color space (e.g., a space of color names) is performed as follows. The frame is a coded representation of user-specified attribute descriptions for a problem domain. In a color space each attribute corresponding to a primary hue is described by a bitfield in the frame. The first bit of each bitfield is always a logical one. Subsequent bits in a given bitfield are logical zeros. Each logical zero represents an additional bit of resolution.

In an illustrative color space a frame "010101" comprises three two-bit bitfields where: the rightmost pair of bits represents the red attribute; the center pair of bits represents the green attribute; and the leftmost pair of bits represents the blue attribute. The primary function of a frame is as an interpreter which distinguishes between the possible meanings of an object descriptor or an object selector.

In an illustrative color space the object descriptor is the result of a transformation of a frame where the bits of each frame bitfield are interleaved. When, for example, the frame "010101" is interleaved the result is the object descriptor "000111." The primary function of an object descriptor is its role in generating N-dimensional object spaces. Using the frame to distinguish dimensional bits from resolution bits, the object descriptor determines the orthogonal generation of N-dimensional object spaces.

There are two notions of cycles associated with the orthogonal generation of N-dimensional object spaces. The first cycle is the order of interpretation of the object descriptor. Object descriptor bits are logically grouped into dimensional intervals, e.g., "000 111". Each dimensional interval is processed as a cycle beginning at the spatial origin.

A second cycle associated with the orthogonal generation of N-dimensional object spaces is the order of reflection for generating the logical selector names. The steps of the reflection cycle may correspond to the four orthogonal directions: right, up, left, and down. A counterclockwise rather than a clockwise cycle was arbitrarily chosen, but the chosen direction must be strictly adhered to. If the number of dimensions is greater than four, then the reflection process continues in the next orthogonal direction for each non-null position in an expanded form of the object descriptor intervals. The expanded form of an object descriptor inserts null place holders for attributes in the object descriptor whose resolution is less than others in a given interval.

A frame is a positional notation which denotes the number of the values or sense of each bit position in a given frame. Given the frame "010101" and frame data "000010," the rightmost bitfield of frame data "10" represents a value for a particular intensity of the red attribute in a color specification. The object selector is a transformation of frame data where the frame data is interleaved. The result of interleaving frame data "000010" is the object selector "001000." The name of each location in an N-dimensional space corresponds to an object selector.

FIGS. 27-31 show an illustrative example of a color representation system in accordance with the method of the present invention. FIGS. 27A-27C show how the name space elements of a binary RGB color cube are projected onto a plane in accordance with the method of the present invention. Each axis 2701 of the RGB color cube corresponds to a color primary. Each node 2700, 2702 of the RGB color cube corresponds to a particular color sensation or element 2703 in a logical color space. The name of each color sensation of an RGB color space corresponds to a particular element location 2702 in a logical color space. FIG. 27C shows how the elements, name space labels, of a binary RGB color space are labeled. The vertical regions labeled "R" 2704 contain elements whose rightmost bit position is set. The horizontal region labeled "G" 2705 contains elements whose middle bit position is set. The left half labeled "B" 2706 contain elements whose leftmost bit position is set.

Figure 28A:
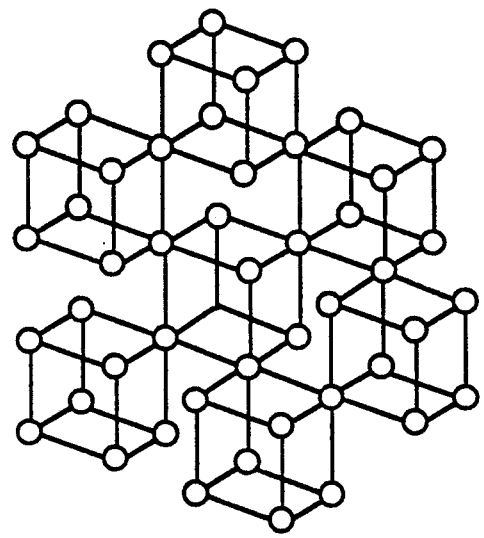
Figure 28B:
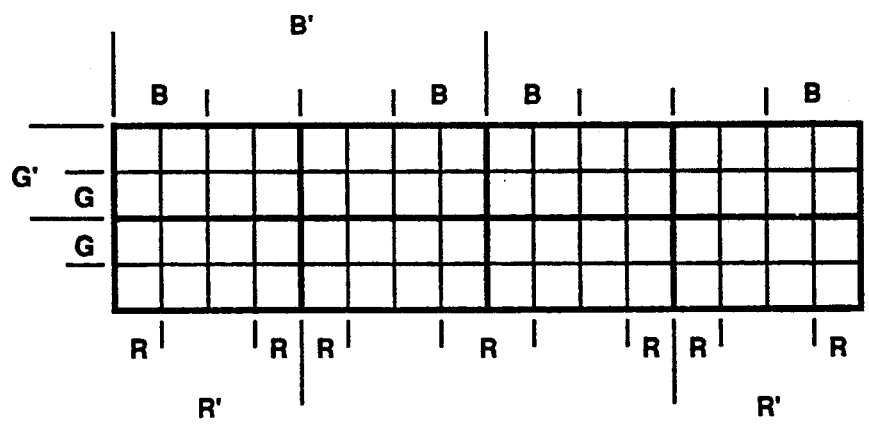

FIGS. 28A-28C show the elements of a sixty-four element RGB color space. FIG. 28B shows how the elements of a sixty-four element RGB color space are labeled. FIG. 28C shows the object selectors of a sixty-four element RGB color space which correspond to the logical names of each color sensation.

Figure 29A:
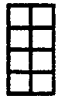
FIG. 29A-29C show relationships between three-dimensional spaces with different resolutions.
Figure 29B:
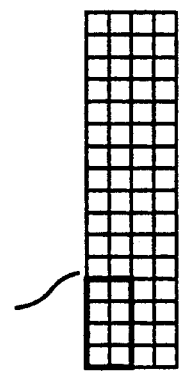
Figure 29C:
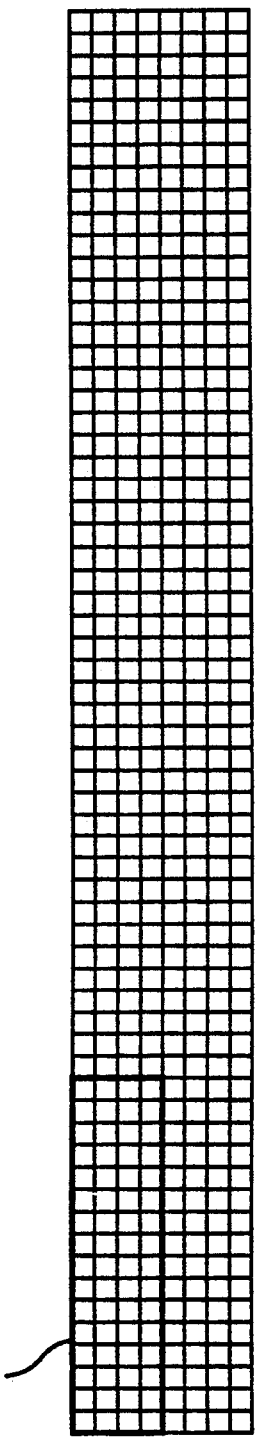

FIGS. 29A-29C show the relationships between three-dimensional spaces with different resolutions. R. Hall in, *Illumination and Color in Computer Generated Imagery*, Springer-Verlag, NY, 1988, p. 48, plots the intensities of the control lights required to match any wavelength as a function of wavelength.

Figure 30:
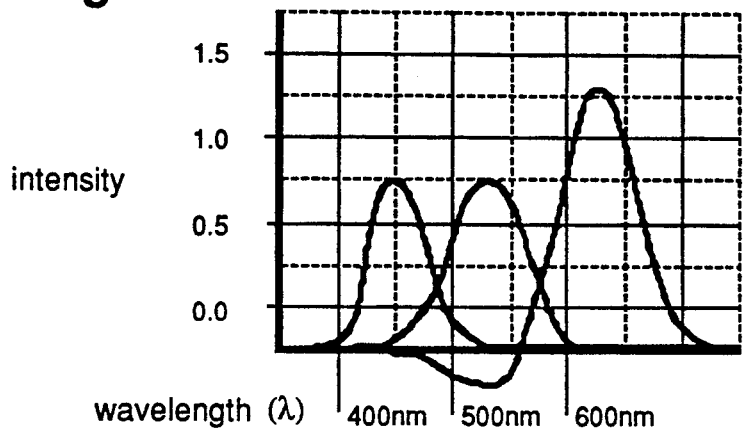
FIGS. 30 shows a graph of matching curves for 445 nm, 535 nm, and 630 nm control sources.
Figure 31A:
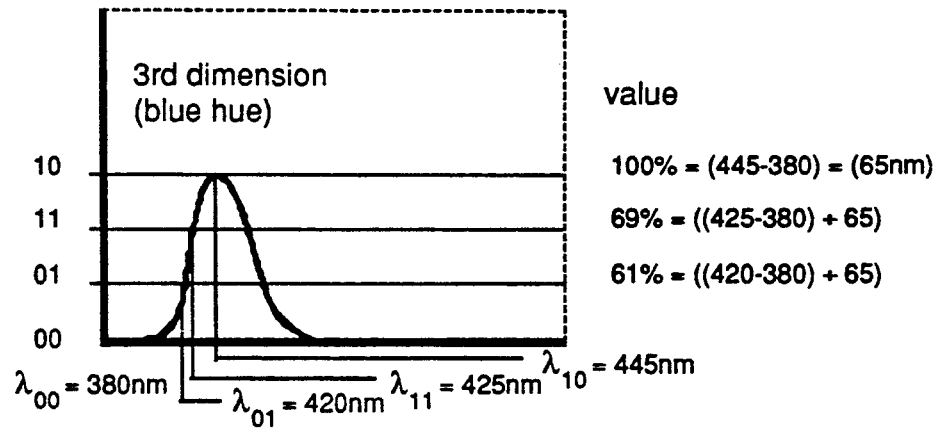
FIGS. 31A-31C show how percentages of spectral intensities over a range of values for each primary are determined in a sixty-four element RGB color space.
Figure 31B:
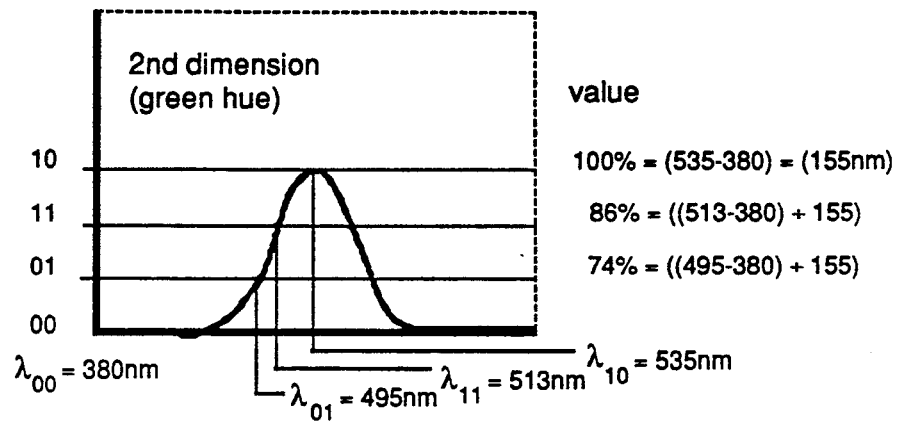
Figure 31C:
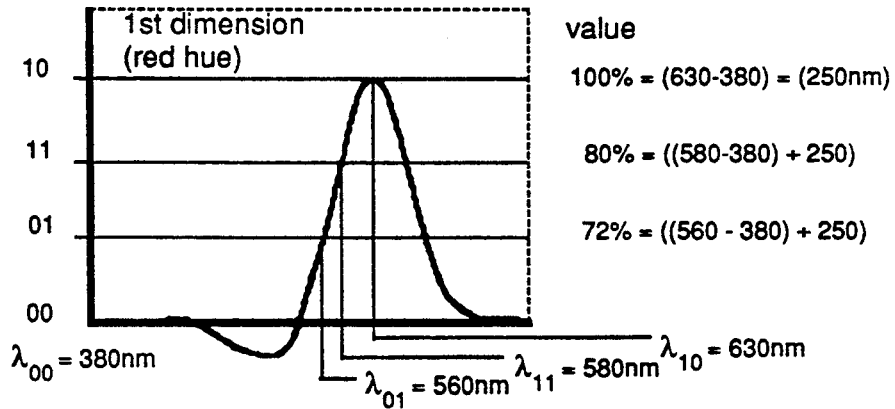

FIG. 30 shows a graph of the resulting matching curves for 445 nm, 535 nm, and 630 nm control sources. FIGS. 31A-31C show how percentages of spectral intensities over a range of values for each primary are determined in a sixty-four element RGB color space, using the graph of matching curves of FIG. 30.

Manipulation of a logical color space is accomplished by methods associated with a particular logical view, such as: elements; relations; paths; regions; and subspaces. Referencing a particular color sensation as an element of a logical color space may be accomplished in two ways: reference by value or reference by location.

Reference by value means a user or an application process provides a description of a particular color sensation in terms of its component hues and their respective intensities, typically as Frame data. Recall that the frame is a positional notation which denotes the number of attributes and the resolution of each attribute. Therefore, frame data correspond to the value or sense of each bit position in a given frame. For example, given the frame "010101" and frame data "000010" the rightmost bitfield of frame data "10" represents a value for a particular intensity of the red attribute in a color specification.

Reference by location means a user or an application process selects a particular color sensation in terms of its location; either indirectly by index (e.g., palette entry) or directly by its selector. Recall that the object selector is a transformation of frame data where the bits of each frame data bitfield are interleaved. For example, given the frame "010101" and frame data "000010" where the frame data is interleaved the result is the object selector "001000." The name of each location in an N-dimensional space corresponds to an object selector.

Referencing a set of harmonious color sensations as relations of a logical color space may be accomplished by generating combinations of n-things taken k at a time, where n is the number of elements in a logical color space and k is the number of selector bits. The elements of a set are said to be neighbors or logically adjacent because one can be obtained from the other by switching a "0" and a "1" in a particular selector bit position. The number of elements in each logical relation corresponds to the number of selector bits. Referencing various sets in a logical color space may be accomplished selectively masking one or more selector bits.

Generating a harmonious sequence of color sensations as paths in a logical color space ma be accomplished because the collection of element names describe a Gray sequence, where the Hamming distance between successive elements is one. The sequence of color sensations is said to cycle if its first and last element codewords differ in only one quantum interval. Otherwise, the sequence of color sensations is known as a path. Given an initial element codeword and a transition sequence the entire set of element codewords in a logical color space can be generated.

Referencing various regions of a logical color space may be accomplished selectively by masking lower-order selector bits. Referencing various subspaces within a logical color space may be accomplished by element scaling; that is, the value of an element location is actually an object descriptor rather than a color sensation.

The process by which a logical color frame is interpreted to electronically produce color sensations is referred to herein as reflected Gray code (RGC) demodulation. RGC demodulation may be generalized as a novel form of digital to analog conversion. The inverse of RGC demodulation is the conversion of analog information to a digital form (e.g., quantization, spectral decomposition, etc.) by the process of RGC modulation. The method of the present invention represents a novel coding system. Object descriptions have meaning, that is, they refer to or describe some system with certain physical or conceptual properties. For color graphics, the objects may be particular color sensations described in terms of attributes such as: red; green; blue; which define a color space. For optical communications, the objects may be a particular coherent light source described in terms of its lightwave components, which define a signal space. The significant aspect of system description is that the actual description is one selected from a set possible descriptions. The invention is a general apparatus and method, designed to operate for each possible problem selection not just the one which will actually be chosen since this is unknown at the time of design.

It will be apparent to those skilled in the art that various modifications can be made to the apparatus and method for visualizing mixed-resolution, N-dimensional object space of the instant invention without departing from the scope or spirit of the invention, and it is intended that the present invention cover modifications and variations of the apparatus and method for visualizing mixed-resolution, N-dimensional object space provided they come within the scope of the appended claims and their equivalents.

We claim:

1. A process for dynamically configuring a logical architecture for using a digital-computing device and for controlling fundamental operations to transform said digital-computing device from a fixed-radix mode of operation imposed by physical architecture of said digital-computing device to a mixed-radix mode of operation, comprising the steps, using said digital-computing device, of:
   a. encoding with said digital-computing device a logical name for each attribute describing a problem space to form an object frame for organizing a contiguous sequence of coded attribute names, each object frame having a logical one bit representing a dimension of an N-dimensional, object space and having a logical zero bit representing a degree of resolution for a range of possible values for a particular attribute for a dimension of an N-dimensional, object space;
   b. interleaving bits of said object frame to generate an object descriptor, said object descriptor representing a name format for referencing storage locations of said digital-computing device and for controlling an order of the storage locations, the storage locations configured as spatial locations of said N-dimensional, object space;
   c. configuring, from said object frame and said object description, the spatial locations as dimensional-spatial locations of said N-dimensional, object space;
   d. configuring, from said object frame and said object descriptor, the spatial locations as resolution-spatial locations for a mixed-resolution, N-dimensional, object space; and
   whereby, said mixed-radix mode of operating said computing device mechanizes methods of selecting mixed-radix expressions for elements, paths and relation of said mixed-resolution, N-dimensional, object space, without the steps of converting mixed-radix expressions to and from unit expressions imposed by the fixed-radix architecture of said computing device.

2. The process as set forth in claim 1 further including the step of repeating steps a though d in response to input to said computing device which changes the description of said problem space, wherein said steps configure a new logical architecture for a mixed-radix mode of operating said computing device.

3. The process as set forth in claim 1 or 2 wherein a machine process dynamically determines a problem space described by at least one attribute defining at least one dimension having at least one level of resolution for configuring storage locations of a digital computing device as spatial locations for a mixed-resolution, N-dimensional, object space.

4. The process as set forth in claim 1 or 2 wherein a user interactively determines a problem space described by at least one attribute defining at least one dimension having at least one level of resolution for configuring storage locations of a digital computing device having a display device for visualizing said problem space description as spatial locations for a mixed-resolution, N-dimensional, object space.

5. The process as set forth in claim 1 or 2 wherein an object selector for referencing a spatial location in a memory configured as a named spatial location of said mixed-resolution, N-dimensional, object space is logically generated by interleaving bits of a particular instance of frame data for a mixed-radix mode of operating said computing device.

6. The process as set forth in claim 1 or 2 wherein a relation between spatial locations in a memory configured as named spatial locations of said mixed-resolution, N-dimensional, object space is logically generated by changing the sense of particular object selector bits for a mixed-radix mode of operating said computing device.

7. The process as set forth in claim 1 or 2 wherein a path comprising a plurality of spatial locations in a memory configured as named spatial locations of said mixed-resolution, N-dimensional, object space is logically generated by changing the sense of particular object selector bits in a particular sequence for a mixed-radix mode of operating said computing device.

8. The process as set forth in claim 1 or 2 wherein a region comprising a plurality of spatial locations in a memory configured as named spatial locations of said mixed-resolution, N-dimensional, object space is logically generated by suppressing particular object selector bits for a mixed-radix mode of operating said computing device.

9. The process as set forth in claim 1 or 2 wherein multiple paths for concurrently selected paths comprising a plurality of spatial locations in a memory configured as named spatial locations of said mixed-resolution, N-dimensional, object space are logically generated by changing the sense of a plurality of object selector bits in a particular sequence for a mixed-radix mode of operating said computing device.

10. An object description system for controlling the logical manipulation of data storage locations of a memory of a digital-computing device configured as at least one mixed-resolution, N-dimensional, object space, wherein the object description system is described as a special purpose computing device having a mixed-radix logical architecture, said digital computing device including processor means for accessing said data storage locations; signal communication means, operatively coupled to said processor means, for communicating control signals, address signals, and data signals to and from said processor means; an input coupled to said processor means by said signal communication means for receiving an object description; and, a memory coupled to said processor means by said signal communication means for storing data; said object description system comprising:
   object means, operatively coupled to said processor means by said signal communication means, including frame means operatively coupled to said processor means by said signal communication means for generating said mixed resolution, N-dimensional, object space, said frame means including, means for interleaving the bits of coded attribute names of an object frame to generate an object descriptor and for interleaving the bits of a particular instance of frame data to generate an object selector; and at least one register for storing said object frame for controlling the order of the interleaving of bits of said object frame by said interleaving means and for controlling the order of the interleaving of bits of said frame data by said interleaving means;

whereby, said data storage locations of said apparatus, when configured as mixed-resolution, N-dimensional, object spaces, are logically addressed and manipulated by fundamental data storage operations without converting mixed-radix expressions to and from unit expressions imposed by the fixed-radix architecture of general purpose computing devices for a mixed-radix mode of operating said computing device.

11. The apparatus as set forth in claim 10 further including:

selector means coupled to said frame means and coupled to said processor means by said signal communication means for selecting elements and paths of said memory configured as said mixed-resolution, N-dimensional, object space, wherein said selector means includes at least one register for storing an object selector; and means for changing the sense of particular object selector bits forming attribute relations between particular elements of said of said memory configured as said mixed-resolution, N-dimensional, object space; and region means coupled to said frame means and coupled to said processor means by said signal communication means for manipulating regions comprising a plurality of related elements of said memory configured as said mixed-resolution, N-dimensional, object space, wherein said region means includes at least one register for storing an object selector; and means for suppressing particular object selector bits forming a region comprising a plurality of related elements of said memory configured as said mixed-resolution, N-dimensional, object space.

12. The apparatus as set forth in claim 10 or 11 wherein said computing device includes display means for visualizing problem space descriptions as spatial locations for a mixed-resolution, N-dimensional, object space, said display means operatively coupled to said processor means and said inputting means by said signal communication means, whereby a user interactively controls the internal operation of said computing device.

13. The apparatus as set forth in claim 10 or 11 for controlling the logical manipulation of data storage locations of at least one memory of a plurality of computing devices configured as at least one mixed-resolution, N-dimensional, object space, wherein the apparatus includes a special purpose multiprocessor having a mixed-radix logical architecture, wherein representations of said at least one mixed-resolution, N-dimensional, object space exist in at least one memory.

14. The apparatus as set forth in claim 10 or 11 wherein a plurality of object description systems are operatively coupled in various logical configurations dictated by the conceptual problem domain, enabling at least one of concurrent manipulation of a plurality of object space descriptions and concurrent manipulation of a plurality of views of a particular object space description.

* * * * *

UNITED STATES PATENT AND TRADEMARK OFFICE
CERTIFICATE OF CORRECTION

PATENT NO. : 5,301,284

DATED : April 5, 1994

INVENTOR(S) : Mark D. Estes and John P. Walker

It is certified that error appears in the above-identified patent and that said Letters Patent is hereby corrected as shown below:

Column 3, line 20: after "achievable." insert --Gardner states in his book, Logic Machines and Diagrams, Univ. of Chicago Press, 1982, p. 135, "There is now a large literature on Karnaugh maps and various geometrical, tabular, or algebraic methods of minimizing logic statements and their corresponding circuitry, but no completely satisfactory systematic procedure has yet been found."--

Column 4, line 49: after "prior art" delete "h-cube" and insert --n-cube--.

line 53: after "channels in the plan" delete ",".

Column 7, line 6: after "Display" insert --Descriptive Systems," Gerald Murch makes the following--.

line 46: delete "80" and insert --801--.

line 47: delete "80" and insert --801--.

line 56: after "are" insert --suitably designed, the applications of specific small--.

UNITED STATES PATENT AND TRADEMARK OFFICE
CERTIFICATE OF CORRECTION

PATENT NO. : 5,301,284

DATED : April 5, 1994

INVENTOR(S) : Mark D. Estes and John P. Walker

It is certified that error appears in the above-identified patent and that said Letters Patent is hereby corrected as shown below:

Column 8, line 9: delete "synthetic" and insert --systematic--.

Column 10, line 8: delete "related" and insert --relation--.

Column 11, line 58: after "FIGS. 17A-" delete "16C" and insert --17C--.

line 60: after "FIGS. 18A-" delete "16C" and insert --18C--.

line 66: after "FIGS. 21A-" delete "21B" and insert --21C--.

Column 14, line 7: after "onto a plane" insert --.--.

Column 15, line 19: delete "0" and insert --1--.

Column 16, line 45: after "19A-19C" insert --is generated--.

Column 18, line 38: after "FIGS. 22A-22C" delete ",".

line 40: after "FIGS. 22A-" delete "22C" and insert --22B--, and after "again" delete "shows" and insert --show--.

Column 20, line 68: after "device" delete "2" and insert --2400--.

UNITED STATES PATENT AND TRADEMARK OFFICE
CERTIFICATE OF CORRECTION

PATENT NO. : 5,301,284

DATED : April 5, 1994

INVENTOR(S) : Mark D. Estes and John P. Walker

It is certified that error appears in the above-identified patent and that said Letters Patent is hereby corrected as shown below:

Column 25, line 13: after "number of" insert --attributes and the resolution of each attribute. Frame data are--.

Column 26, line 35: after "color space" delete "ma" and insert --may--.

Column 27, line 55: delete "relation" and insert --relations--.

Signed and Sealed this

Fifth Day of January, 1999

Attest:

Attesting Officer

*Acting Commissioner of Patents and Trademarks*